United States Patent
Islam et al.

(12)

(10) Patent No.: US 10,425,901 B2
(45) Date of Patent: Sep. 24, 2019

(54) UPLINK TRANSMIT POWER CONTROL DURING RANDOM ACCESS PROCEDURES

(71) Applicant: QUALCOMM Incorporated, San Diego, CA (US)

(72) Inventors: Muhammad Nazmul Islam, Edison, NJ (US); Sundar Subramanian, San Diego, CA (US); Bilal Sadiq, Basking Ridge, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/015,021

(22) Filed: Jun. 21, 2018

(65) Prior Publication Data

US 2018/0376429 A1 Dec. 27, 2018

Related U.S. Application Data

(60) Provisional application No. 62/525,100, filed on Jun. 26, 2017.

(51) Int. Cl.
*H04W 52/14* (2009.01)
*H04W 16/28* (2009.01)
(Continued)

(52) U.S. Cl.
CPC ........ *H04W 52/146* (2013.01); *H04B 7/0617* (2013.01); *H04W 16/28* (2013.01);
(Continued)

(58) Field of Classification Search
CPC ...... H04B 7/0695; H04B 7/08; H04B 7/0617; H04L 27/261; H04W 16/28;
(Continued)

(56) References Cited

U.S. PATENT DOCUMENTS

2007/0285312 A1* 12/2007 Gao .................. H01Q 1/246
342/367
2011/0105174 A1* 5/2011 Pelletier ............ H04W 52/42
455/522
(Continued)

FOREIGN PATENT DOCUMENTS

WO WO-2016086144 A1 6/2016
WO WO2017155239 A2 9/2017
(Continued)

OTHER PUBLICATIONS

International Search Report and Written Opinion—PCT/US2018/039025—ISA/EPO—dated Sep. 28, 2018.

*Primary Examiner* — Tan H Trinh
(74) *Attorney, Agent, or Firm* — Holland & Hart LLP

(57) ABSTRACT

A transmit beamforming gain and a receive beamforming gain may be used when adjusting an uplink transmit power. For example, a user equipment (UE) may receive downlink communications from a base station on a receive beam having a beamforming gain that is different from a beamforming gain for an uplink transmit beam. The UE may adjust an uplink transmit power (e.g., for transmitting a random access channel (RACH)) based on a difference in the beamforming gains. For example, a parameter representing the difference in the beamforming gains, in addition to a maximum allowed transmit power, a target preamble received power, and an estimated path loss, may be used when determining an adjusted uplink transmit power for a RACH transmission. The adjustment may result in a higher or lower transmit power depending on the difference in the receive beamforming gain and the transmit beamforming gain.

30 Claims, 20 Drawing Sheets

(51) Int. Cl.

| | | |
|---|---|---|
| *H04W 74/08* | (2009.01) | |
| *H04W 76/27* | (2018.01) | |
| *H04W 72/04* | (2009.01) | |
| *H04B 7/06* | (2006.01) | |
| *H04W 52/16* | (2009.01) | |
| *H04W 52/24* | (2009.01) | |
| *H04W 52/32* | (2009.01) | |
| *H04W 52/42* | (2009.01) | |
| *H04W 74/00* | (2009.01) | |

(52) U.S. Cl.
CPC ......... *H04W 52/16* (2013.01); *H04W 52/242* (2013.01); *H04W 52/325* (2013.01); *H04W 52/42* (2013.01); *H04W 72/042* (2013.01); *H04W 74/008* (2013.01); *H04W 74/0833* (2013.01); *H04W 76/27* (2018.02); *H04W 72/0473* (2013.01)

(58) Field of Classification Search
CPC . H04W 52/146; H04W 52/16; H04W 52/242; H04W 52/325; H04W 52/42; H04W 72/042; H04W 72/0473; H04W 74/008; H04W 74/0833; H04W 76/27
USPC ............ 455/13.3, 82, 83, 575.7, 562.1, 212, 455/158.1; 370/252, 328, 329; 375/224; 342/372, 367
See application file for complete search history.

(56) References Cited

U.S. PATENT DOCUMENTS

| | | | |
|---|---|---|---|
| 2013/0016681 A1 | 1/2013 | Gholmieh et al. | |
| 2013/0039195 A1* | 2/2013 | Weng | H04W 48/20 370/252 |
| 2013/0121185 A1* | 5/2013 | Li | H04W 72/046 370/252 |
| 2013/0229307 A1* | 9/2013 | Chang | H01Q 1/246 342/372 |
| 2013/0242911 A1* | 9/2013 | Heo | H04L 5/001 370/329 |
| 2014/0016573 A1 | 1/2014 | Nuggehalli et al. | |
| 2014/0044044 A1* | 2/2014 | Josiam | H04W 24/10 370/328 |
| 2014/0146863 A1* | 5/2014 | Seol | H04B 7/0456 375/224 |
| 2014/0177607 A1 | 6/2014 | Li et al. | |
| 2014/0185481 A1 | 7/2014 | Seol et al. | |
| 2015/0049824 A1* | 2/2015 | Kim | H04B 7/0456 375/267 |
| 2016/0043792 A1* | 2/2016 | Jeong | H01Q 3/34 370/328 |
| 2016/0205633 A1* | 7/2016 | Mizusawa | H04B 7/0404 455/522 |
| 2016/0353424 A1* | 12/2016 | Stirling-Gallacher | H04B 7/0626 |
| 2016/0353440 A1* | 12/2016 | Lee | H04W 4/70 |
| 2017/0202029 A1* | 7/2017 | Qi | H04W 76/10 |
| 2017/0251460 A1* | 8/2017 | Agiwal | H04W 72/0406 |
| 2017/0310376 A1* | 10/2017 | Jarmyr | H04B 7/0469 |
| 2017/0317866 A1* | 11/2017 | Stirling-Gallacher | H04B 7/0695 |
| 2017/0332407 A1* | 11/2017 | Islam | H04W 52/242 |
| 2018/0014254 A1* | 1/2018 | Hwang | H04W 52/146 |
| 2018/0034529 A1* | 2/2018 | Hessler | H04B 7/0632 |
| 2018/0034606 A1* | 2/2018 | Ahn | H04L 5/0048 |
| 2018/0049137 A1 | 2/2018 | Li et al. | |
| 2018/0083680 A1* | 3/2018 | Guo | H04B 7/0617 |
| 2018/0092052 A1* | 3/2018 | Liu | H04W 24/02 |
| 2018/0103433 A1* | 4/2018 | Li | H04W 52/325 |
| 2018/0131425 A1* | 5/2018 | Li | H04B 7/088 |
| 2018/0176948 A1* | 6/2018 | Islam | H04L 1/0015 |
| 2018/0176949 A1* | 6/2018 | Islam | H04W 52/146 |
| 2018/0192375 A1* | 7/2018 | Xia | H04W 52/146 |
| 2018/0213484 A1* | 7/2018 | Oh | H04W 52/42 |
| 2018/0227862 A1* | 8/2018 | Liu | H04W 52/42 |
| 2018/0235013 A1* | 8/2018 | Jung | H04W 74/0833 |
| 2018/0279231 A1* | 9/2018 | Meng | H04W 52/325 |
| 2018/0332541 A1* | 11/2018 | Liu | H04W 52/146 |
| 2019/0132880 A1* | 5/2019 | Byun | H04B 7/0408 |

FOREIGN PATENT DOCUMENTS

| | | |
|---|---|---|
| WO | WO2018059419 A1 | 4/2018 |
| WO | WO-2018126850 A1 | 7/2018 |

* cited by examiner

UPLINK TRANSMIT POWER CONTROL DURING RANDOM ACCESS PROCEDURES

CROSS REFERENCES

The present Application for Patent claims the benefit of U.S. Provisional Patent Application No. 62/525,100 by Islam et al., entitled "Uplink Transmit Power Control During Random Access Procedures," filed Jun. 26, 2017, assigned to the assignee hereof, and expressly incorporated by reference in its entirety.

BACKGROUND

The following relates generally to wireless communication, and more specifically to uplink transmit power control during random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, base stations and UEs may communicate using directional transmissions (e.g., beams), where beamforming techniques may be applied using one or more antenna arrays to generate beams in different directions. For example, a base station may transmit downlink communications (e.g., synchronization signals, data, etc.) to a UE using a transmit beam in a particular direction, and the UE may in turn receive the downlink communications on a receive beam in an opposite direction. In some cases, a high transmit power for uplink communications sent from a UE and received at a base station may result in interference for other users attempting to communicate with the base station. Alternatively, the uplink transmit power from the UE may too low, failing to meet a link budget for uplink communications received at the base station.

SUMMARY

The described techniques relate to improved methods, systems, devices, or apparatuses that support uplink power control for random access procedures. Generally, the described techniques provide for the use of a transmit beamforming gain and a receive beamforming gain when adjusting an uplink transmit power. For example, a user equipment (UE) may receive downlink communications (e.g., synchronization signals, data, etc.) from a base station on a receive beam having a beamforming gain that is different from a beamforming gain for an uplink transmit beam. The UE may adjust an uplink transmit power (e.g., for transmitting a random access channel (RACH)) based on a difference in the beamforming gains. For example, when calculating the uplink transmit power for the RACH transmission, a parameter representing the difference in the beamforming gains may be used in addition to a maximum allowed transmit power, a target preamble received power, and an estimated path loss. The adjustment may result in a higher or lower transmit power depending on the difference in the receive beamforming gain and the transmit beamforming gain. In some cases, the use of the transmit and receive beamforming gains when determining the uplink transmit power may be based on whether the UE has beam correspondence, or may be based on interference levels associated with a communications link between the UE and base station. In some examples, a base station may provide instruction to the UE to adjust the transmit power, for example, based on the presence or absence of beam correspondence or interference levels.

A method of wireless communication is described. The method may include determining a transmit beamforming gain for a transmit beam of the UE, determining a receive beamforming gain for a receive beam of the UE, determining a transmit power for an uplink random access transmission based on the determined transmit beamforming gain and the determined receive beamforming gain, and transmitting the uplink random access transmission using the determined transmit power.

An apparatus for wireless communication is described. The apparatus may include means for determining a transmit beamforming gain for a transmit beam of the UE, means for determining a receive beamforming gain for a receive beam of the UE, means for determining a transmit power for an uplink random access transmission based on the determined transmit beamforming gain and the determined receive beamforming gain, and means for transmitting the uplink random access transmission using the determined transmit power.

Another apparatus for wireless communication is described. The apparatus may include a processor, memory in electronic communication with the processor, and instructions stored in the memory. The instructions may be operable to cause the processor to determine a transmit beamforming gain for a transmit beam of the UE, determine a receive beamforming gain for a receive beam of the UE, determine a transmit power for an uplink random access transmission based on the determined transmit beamforming gain and the determined receive beamforming gain, and transmit the uplink random access transmission using the determined transmit power.

A non-transitory computer readable medium for wireless communication is described. The non-transitory computer-readable medium may include instructions operable to cause a processor to determine a transmit beamforming gain for a transmit beam of the UE, determine a receive beamforming gain for a receive beam of the UE, determine a transmit power for an uplink random access transmission based on the determined transmit beamforming gain and the determined receive beamforming gain, and transmit the uplink random access transmission using the determined transmit power.

In some examples of the method, apparatus, and non-transitory computer-readable medium described above, the determining the transmit power includes: determining a beamforming gain difference between the transmit beamforming gain and the receive beamforming gain. Some examples of the method, apparatus, and non-transitory computer-readable medium described above may further include processes, features, means, or instructions for determining the transmit power based on the determined beamforming gain difference.

In some examples of the method, apparatus, and non-transitory computer-readable medium described above, the beamforming gain difference includes a difference between a minimum beamforming gain for the transmit beam and a maximum beamforming gain for the receive beam. In some examples of the method, apparatus, and non-transitory computer-readable medium described above, the beamforming gain difference includes a difference between a minimum crossover point beamforming gain for a set of transmit beams, including the transmit beam, and a maximum beamforming gain for a set of receive beams, including the receive beam.

In some examples of the method, apparatus, and non-transitory computer-readable medium described above, the set of transmit beams includes all transmit beams of the UE, and where the set of receive beams includes all receive beams of the UE.

In some examples of the method, apparatus, and non-transitory computer-readable medium described above, the beamforming gain difference includes a difference between a fixed beamforming gain for the transmit beam and a fixed beamforming gain for the receive beam.

Some examples of the method, apparatus, and non-transitory computer-readable medium described above may further include processes, features, means, or instructions for receiving, from a base station, an indication of the fixed beamforming gain for the transmit beam, or the fixed beamforming gain for the receive beam, or a combination thereof, where the indication may be received in a master information block (MIB), or a remaining minimum system information (RMSI), or an other system information (OSI), or a system information block (SIB), radio resource control (RRC) signaling, a handover command, a medium access control (MAC) control element (CE), downlink control information (DCI), or a combination thereof.

In some examples of the method, apparatus, and non-transitory computer-readable medium described above, the beamforming gain difference includes a difference between a maximum beamforming gain for the transmit beam and a fixed beamforming gain for the receive beam. Some examples of the method, apparatus, and non-transitory computer-readable medium described above may further include processes, features, means, or instructions for receiving, from a base station, an indication of the fixed beamforming gain for the receive beam, where the indication may be received in a MIB, a RMSI, an OSI, a SIB, RRC signaling, a handover command, a MAC-CE, DCI, or a combination thereof In some examples of the method, apparatus, and non-transitory computer-readable medium described above, the beamforming gain difference includes a difference between a fixed beamforming gain for the transmit beam and a maximum beamforming gain for the receive beam. Some examples of the method, apparatus, and non-transitory computer-readable medium described above may further include processes, features, means, or instructions for receiving, from a base station, an indication of the fixed beamforming gain for the transmit beam, where the indication may be received in a MIB, a RMSI, an OSI, a SIB, RRC signaling, a handover command, a MAC-CE, DCI, or a combination thereof.

Some examples of the method, apparatus, and non-transitory computer-readable medium described above may further include processes, features, means, or instructions for determining the transmit power may be further based on a target preamble received power, an estimated path loss, and a maximum transmit power for the UE. In some examples of the method, apparatus, and non-transitory computer-readable medium described above, determining the transmit power further includes: adding the determined beamforming gain difference to a sum of the target preamble received power and the estimated path loss.

In some examples of the method, apparatus, and non-transitory computer-readable medium described above, determining the transmit power further includes: subtracting the determined beamforming gain difference from a sum of the target preamble received power and the estimated path loss. In some examples of the method, apparatus, and non-transitory computer-readable medium described above, the transmit beamforming gain includes a transmit array gain, or a first antenna element gain, or a combination thereof, and the receive beamforming gain includes a receive array gain, or a second antenna element gain, or a combination thereof. In some examples of the method, apparatus, and non-transitory computer-readable medium described above, the transmit beamforming gain includes a summation of the transmit array gain and the first antenna element gain, and the receive beamforming gain includes a summation of the receive array gain and the second antenna element gain.

Some examples of the method, apparatus, and non-transitory computer-readable medium described above may further include processes, features, means, or instructions for determining a beam correspondence state indicating a correspondence between one or more uplink transmit beams, including the transmit beam, and one or more downlink receive beams, including the receive beam, where the adjusting the transmit power may be based on the determined beam correspondence state.

Some examples of the method, apparatus, and non-transitory computer-readable medium described above may further include processes, features, means, or instructions for identifying one of a plurality of adjustment procedures to use to adjust the transmit power for the uplink random access transmission based on the determined transmit beamforming gain and the determined receive beamforming gain. Some examples of the method, apparatus, and non-transitory computer-readable medium described above may further include processes, features, means, or instructions for adjusting the transmit power based on the identified adjustment procedure.

Some examples of the method, apparatus, and non-transitory computer-readable medium described above may further include processes, features, means, or instructions for receiving, from a base station, an instruction to adjust the transmit power based on the determined beam correspondence state. In some examples of the method, apparatus, and non-transitory computer-readable medium described above, the instruction may be received in a MIB, a RMSI, an OSI, a SIB, RRC signaling, a handover command, a MAC-CE, DCI, or a combination thereof.

In some examples of the method, apparatus, and non-transitory computer-readable medium described above, receiving an indication of a power offset from a base station, where determining the transmit power for the uplink random access transmission includes: applying the power offset based on the determined beam correspondence state. In some examples of the method, apparatus, and non-transitory computer-readable medium described above, the uplink random access transmission includes a message transmitted on a physical random access channel (PRACH) during a random access procedure.

A method of wireless communication is described. The method may include identifying a UE, the UE having a transmit beam and a receive beam and transmitting an instruction to the UE for the UE to use to adjust a transmit power for an uplink random access transmission of the UE based on a transmit beamforming gain for the transmit beam of the UE, or a receive beamforming gain for the receive beam of the UE, or a beam correspondence state at the UE, or a combination thereof.

An apparatus for wireless communication is described. The apparatus may include means for identifying a UE, the UE having a transmit beam and a receive beam and means for transmitting an instruction to the UE for the UE to use to adjust a transmit power for an uplink random access transmission of the UE based on a transmit beamforming gain for the transmit beam of the UE, or a receive beamforming gain for the receive beam of the UE, or a beam correspondence state at the UE, or a combination thereof.

Another apparatus for wireless communication is described. The apparatus may include a processor, memory in electronic communication with the processor, and instructions stored in the memory. The instructions may be operable to cause the processor to identify a UE, the UE having a transmit beam and a receive beam and transmit an instruction to the UE for the UE to use to adjust a transmit power for an uplink random access transmission of the UE based on a transmit beamforming gain for the transmit beam of the UE, or a receive beamforming gain for the receive beam of the UE, or a beam correspondence state at the UE, or a combination thereof.

A non-transitory computer readable medium for wireless communication is described. The non-transitory computer-readable medium may include instructions operable to cause a processor to identify a UE, the UE having a transmit beam and a receive beam and transmit an instruction to the UE for the UE to use to adjust a transmit power for an uplink random access transmission of the UE based on a transmit beamforming gain for the transmit beam of the UE, or a receive beamforming gain for the receive beam of the UE, or a beam correspondence state at the UE, or a combination thereof.

Some examples of the method, apparatus, and non-transitory computer-readable medium described above may further include processes, features, means, or instructions for identifying an estimated interference level, where the instruction may be selected based on the estimated interference level. Some examples of the method, apparatus, and non-transitory computer-readable medium described above may further include processes, features, means, or instructions for transmitting a power value regarding a beamforming gain to the UE.

In some examples of the method, apparatus, and non-transitory computer-readable medium described above, the UE applies a power offset value to the transmit power for the uplink random access transmission based on the beam correspondence state at the UE. In some examples of the method, apparatus, and non-transitory computer-readable medium described above, the power value denotes a power offset for the UE to use to estimate a difference between the transmit beamforming gain and the receive beamforming gain, the UE using the estimated difference to adjust the transmit power for the uplink random access transmission.

In some examples of the method, apparatus, and non-transitory computer-readable medium described above, the UE uses the transmitted power value as an estimate of the transmit beamforming gain, or the receive beamforming gain, or a combination thereof. Some examples of the method, apparatus, and non-transitory computer-readable medium described above may further include processes, features, means, or instructions for identifying an interference level associated with communications with the UE. Some examples of the method, apparatus, and non-transitory computer-readable medium described above may further include processes, features, means, or instructions for transmitting the instruction based on the identified interference level.

Some examples of the method, apparatus, and non-transitory computer-readable medium described above may further include processes, features, means, or instructions for determining that the identified interference level does not satisfy a predetermined threshold. Some examples of the method, apparatus, and non-transitory computer-readable medium described above may further include processes, features, means, or instructions for identifying a power offset based on the determination, where the instruction includes an indication for the UE to add the power offset when calculating the transmit power.

Some examples of the method, apparatus, and non-transitory computer-readable medium described above may further include processes, features, means, or instructions for determining that the identified interference level satisfies a predetermined threshold. Some examples of the method, apparatus, and non-transitory computer-readable medium described above may further include processes, features, means, or instructions for identifying a power offset based on the determination, where the instruction includes an indication for the UE to subtract the power offset when calculating the transmit power.

Some examples of the method, apparatus, and non-transitory computer-readable medium described above may further include processes, features, means, or instructions for determining a power offset associated with the receive beamforming gain and the transmit beamforming gain. Some examples of the method, apparatus, and non-transitory computer-readable medium described above may further include processes, features, means, or instructions for transmitting the instruction including the determined power offset. In some examples of the method, apparatus, and non-transitory computer-readable medium described above, the determined power offset value indicates a difference between the receive beamforming gain and the transmit beamforming gain used by the UE to adjust the transmit power.

In some examples of the method, apparatus, and non-transitory computer-readable medium described above, the transmitting the instruction includes: transmitting the instruction in a MIB, a RMSI, an OSI, a SIB, RRC signaling, a handover command, a MAC-CE, DCI, or a combination thereof. In some examples of the method, apparatus, and non-transitory computer-readable medium described above, the beam correspondence state indicates a correspondence between one or more uplink transmit beams of the UE, including the transmit beam, and one or more downlink receive beams of the UE, including the receive beam.

Some examples of the method, apparatus, and non-transitory computer-readable medium described above may further include processes, features, means, or instructions for transmitting, to the UE, an indication of a fixed beamforming gain for the receive beam, or a fixed beamforming gain for the transmit beam, or a combination thereof. In some examples of the method, apparatus, and non-transitory computer-readable medium described above, the indication may be transmitted in a MIB, a RMSI, an OSI, a SIB, RRC signaling, a handover command, a MAC-CE, DCI, or a combination thereof.

In some examples of the method, apparatus, and non-transitory computer-readable medium described above, the indication may be transmitted with the instruction. Some examples of the method, apparatus, and non-transitory computer-readable medium described above may further include processes, features, means, or instructions for receiving a random access message from the UE on the transmit beam, where the random access message may be transmitted by the UE using an adjusted transmit power based on the transmitted instruction.

DETAILED DESCRIPTION

Figure 1:
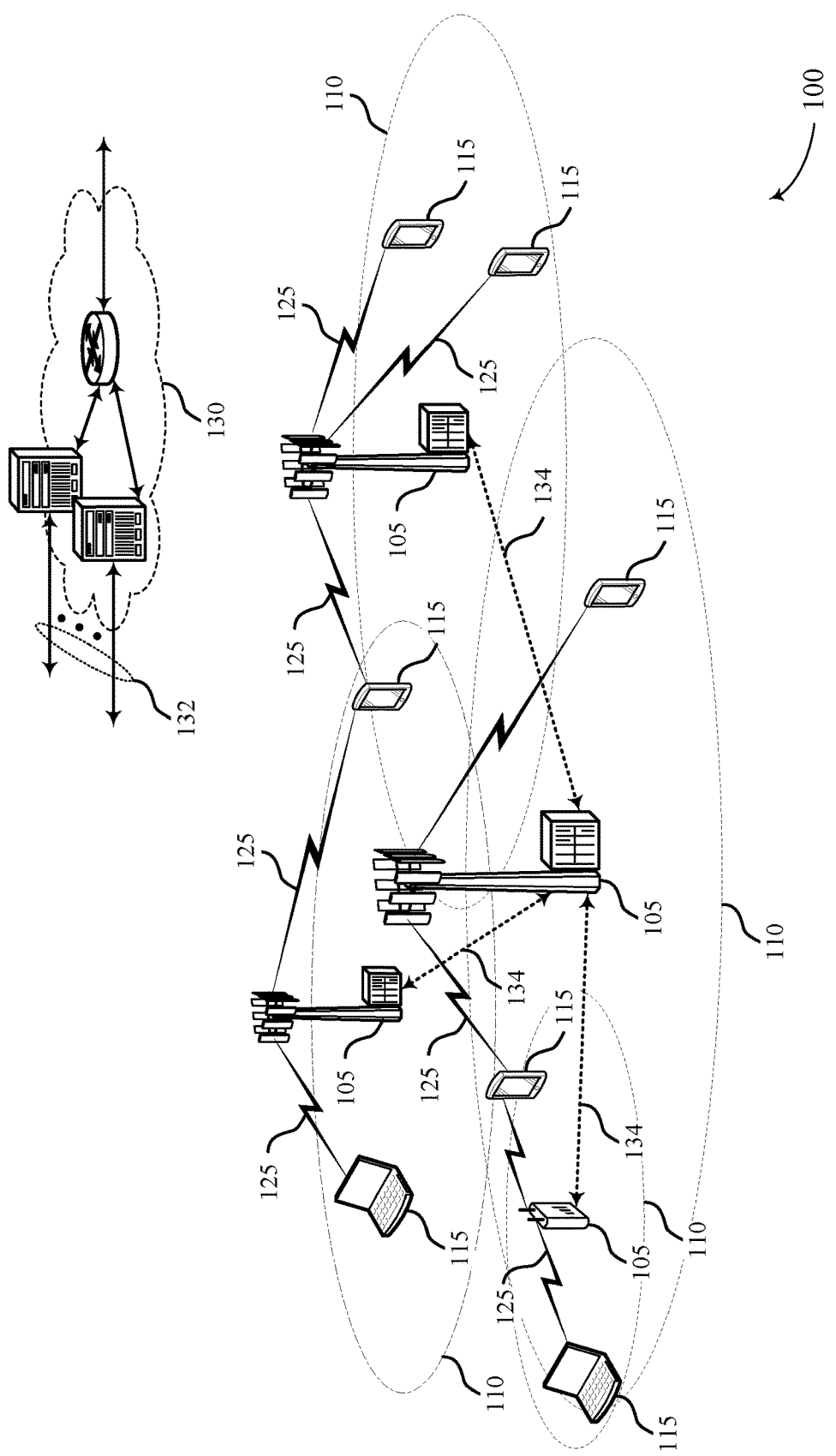
FIG. 1 illustrates an example of a wireless communications system that supports uplink transmit power control during random access procedures in accordance with aspects of the present disclosure.

Some wireless communication systems may support beamformed transmissions between a base station and a user equipment (UE). For example, some systems may operate in millimeter wave (mmW) frequency ranges, e.g., 28 gigahertz (GHz), 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with arrays of antennas to form beams in various directions using a number of analog weight factors. For example, as a base station transmits downlink signals using directional transmit beams, a UE may also utilize beamforming for the UE's own directional receive beams (and its uplink transmit beams for uplink transmissions to the base station).

In some cases, different beamforming gains associated with transmit and receive beams at a UE may lead to undesirable transmit power utilization by a UE. For example, a beamforming gain of the UE's downlink receive beam may not be appropriately matched to a beamforming gain of the UE's uplink transmit beam, such as in cases where an angle of departure and an angle of arrival are different, or when the UE does not have beam correspondence, etc. As a result, when the UE transmits an uplink signal to the base station, the transmit power may unnecessarily interfere with communications by other UEs or may not be powerful enough to be received by the base station. The uplink transmission power utilized by the UE in such cases may thus prohibit efficient communications within the wireless system.

However, as described herein, a UE may adjust an uplink transmit power based on uplink and downlink beamforming gains (e.g., an array gain, an antenna element gain, the summation of an array gain and one or more antenna element gains, etc.). For example, a UE may use a difference in the uplink and downlink beamforming gains associated with uplink transmit beams and downlink receive beams, respectively, to calculate an uplink transmit power (e.g., for sending a physical random access channel (PRACH)). For instance, the UE may apply the beamforming gain difference in such a way that the uplink transmit power is reduced, thereby limiting or preventing interference to other UEs. Additionally or alternatively, the beamforming gain difference may be applied such that the transmit power is increased to sufficiently meet a link budget for uplink signals. In any case, the UE may either add a power offset to, or subtract the power offset from, a preamble receive target power and estimated path loss to determine a uplink transmit power, which may improve communications efficiency. Additionally, in cases where the transmit power is reduced through the use of a power offset, power savings may be achieved at the UE (e.g., by determining an appropriate transmit power for random access procedures).

In some examples, a base station may instruct the UE to adjust the uplink transmit power used for a PRACH. For instance, the base station may send an indication to adjust an uplink transmit power using a beamforming gain difference, which may be based on whether the UE has beam correspondence, or whether there is a mismatch in the beamforming gains associated with respective transmit and receive beams, even in cases where the UE has beam correspondence. In other cases, the base station may request that the UE 115 adjust its uplink transmit power based on a measured level of interference.

Aspects of the disclosure are initially described in the context of a wireless communications system. Examples are also provided which describe various transmit and receive beam configurations for which efficient transmit power control may be applied using different beamforming gains experienced by a UE. Aspects of the disclosure are further illustrated by and described with reference to apparatus diagrams, system diagrams, and flowcharts that relate to uplink transmit power control during random access procedures.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive beamforming gains for the calculation of an uplink transmit power. Accordingly, a power offset may be used when calculating an uplink random access transmit power.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 megahertz (MHz) to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration. In some examples, PSS, SSS, and/or broadcast information (e.g., PBCH) may be transmitted within different synchronization signal (SS) blocks on respective directional beams, where one or more SS blocks may be included within an SS burst. In some cases, these SS blocks or SS bursts may be transmitted at different times and/or using different beams.

After decoding the MIB, the UE 115 may receive one or more system information blocks (SIBs). For example, SIB1 may contain cell access parameters and scheduling information for other SIBs. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless devices in wireless communications system 100 may send transmissions in accordance with a certain link budget. The link budget may account for allowed signal attenuation between a UE 115 and a base station 105, as well as antenna gains at the UE 115 and base station 105. Accordingly, the link budget may provide, for example, a maximum transmit power for the various wireless devices within wireless communications system 100. In some cases, a UE 115 may coordinate transmit power with a serving base station 105 to mitigate interference, improve the uplink data rate, and prolong battery life.

Uplink power control may include a combination of open-loop and closed-loop mechanisms. In open-loop power control, the UE transmit power may depend on estimates of the downlink path-loss and channel configuration. In closed-loop power control, the network may directly control the UE transmit power using explicit power-control commands. Open-loop power control may be used for initial access, such as the transmission of a physical random access channel (PRACH) by a UE 115, whereas both open and closed loop control may be used for uplink control and data transmission. A UE 115 may determine power using an algorithm that takes into account a maximum transmission power limit, a target base station receive power, path loss, modulation and coding scheme (MCS), the number of resources used for transmission, and a format of the transmitted data (e.g., physical uplink control channel (PUCCH) format). Power adjustments may be made by a base station 105 using a transmit power command (TPC) messages, which may incrementally adjust the transmit power of a UE 115 as appropriate.

A UE 115 may determine an uplink transmit power for a PRACH based on an estimated path loss (e.g., a path loss experienced during synchronization). For example, the UE 115 may estimate a path loss and determine an uplink transmit power for sending a RACH in accordance with the equation:

$$P_{PRACH} = \min\{P_{CMAX_C}(i), \text{PREAMBLE\_RECEIVED\_TARGET\_POWER} + PL_c\} \quad [\text{dBm}] \tag{1}$$

where $P_{CMAX,c}$ is a configured maximum transmit power for a subframe i of a serving cell c for a UE 115, PREAMBLE_RECEIVED_TARGET_POWER is a desired receive power indicated by a base station 105 (e.g., in SIB1)), and $PL_c$ is a downlink path loss estimate determined by the UE 115 for the serving cell c. After determining the uplink transmit power for PRACH, the UE 115 may then transmit a RACH preamble using PRACH to the base station 105 at the determined power level. In some examples, a base station 105 may direct power adjustments based on beam correspondence (or lack thereof) experienced by a UE 115.

In such cases, the base station 105 may provide instruction to the UE 115 to utilize a power offset when calculating an uplink transmit power, such as an uplink transmit power for a PRACH.

Wireless communications system 100 may support the use of a transmit beamforming gain and a receive beamforming gain when adjusting an uplink transmit power. For example, a UE 115 may receive downlink communications (e.g., synchronization signals, data, etc.) from a base station 105 on a receive beam having a beamforming gain that is different from a beamforming gain for an uplink transmit beam. The UE 115 may adjust an uplink transmit power (e.g., for transmitting a RACH preamble) based on a difference in the beamforming gains. For example, a parameter representing the difference in the beamforming gains may be used in addition to a maximum allowed transmit power, a target preamble received power, and an estimated path loss when calculating the uplink transmit power for the RACH transmission. The adjustment may result in a higher or lower transmit power depending on the difference in the receive beamforming gain and the transmit beamforming gain. In some cases, the use of the transmit and receive beamforming gains when determining the uplink transmit power may be based on whether the UE 115 has beam correspondence, or may be based on interference levels for a communications link between the UE 115 and base station 105. In some examples, a base station 105 may provide instruction to the UE 115 to adjust the transmit power, for example, based on the presence or absence of beam correspondence or interference levels.

Figure 2:
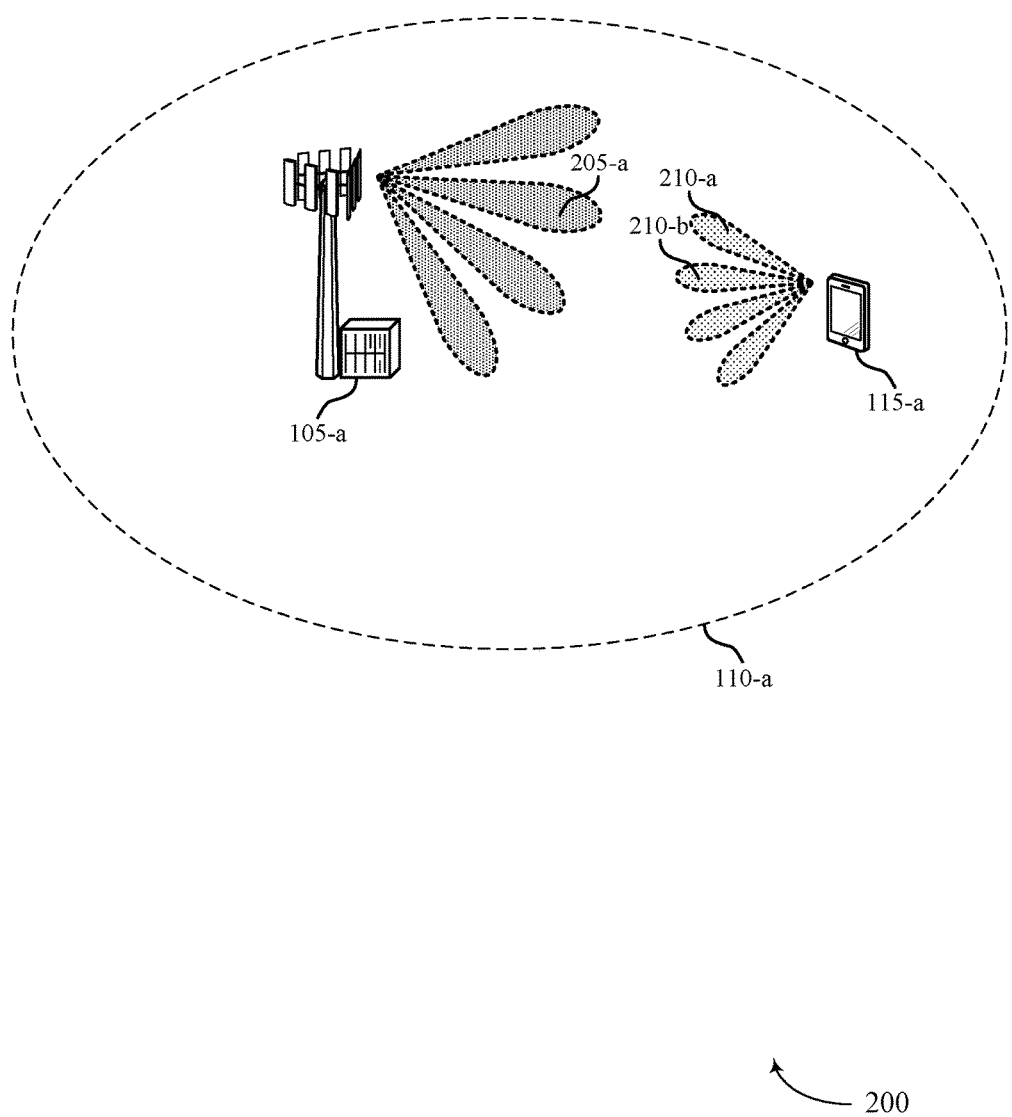
FIG. 2 illustrates an example of a wireless communications system that supports uplink transmit power control during random access procedures in accordance with aspects of the present disclosure.

FIG. 2 illustrates an example of a wireless communications system 200 that supports uplink transmit power control during random access procedures in accordance with various aspects of the present disclosure. In some examples, wireless communications system 200 may implement aspects of wireless communications system 100. For example, wireless communications system 200 may include a base station 105-a and a UE 115-a, which may be examples of the corresponding devices described with reference to FIG. 1. Wireless communications system 200 may support uplink transmit power control based on beamforming gains for transmit and receive beams at UE 115-a, enabling efficient power adjustment techniques for transmitting random access transmissions. The base station beams 205 and UE beams 210 described below may be representations of directional beams formed by a wireless device and used for transmit beams, receive beams, or both.

Wireless communications system 200 may support beamformed transmissions between base station 105-a and UE 115-a. For example, wireless communications system 200 may operate using multiple communication beams (e.g., in mmW frequency ranges). As a result, signal processing techniques, such as beamforming, may be used to coherently combine energy and overcome path losses. By way of example, base station 105-a may utilize multiple antennas, and each antenna may transmit (or receive) a phase-shifted version of a signal such that the phase-shifted versions constructively interfere in certain regions and destructively interfere in others. Weights may be applied to the various phase-shifted versions (e.g., in order to steer the transmissions in a desired direction). Such techniques (or similar techniques) may serve to increase the coverage area 110-a of the base station 105-a or otherwise benefit wireless communications system 200.

Base station 105-a may include base station beams 205 for communication (e.g., including a base station transmit beam and a base station receive beam), and UE 115-a may also include UE beams 210 for communication (e.g., including a UE transmit beam and a UE receive beam). Base station beams 205 and UE beams 210 may represent examples of directional beams over which data (or control information) may be transmitted and received. Accordingly, each base station beam 205 may be directed from base station 105-a toward a different region of coverage area 110-a and, in some cases, two or more of base station beams 205 and UE beams 210 may overlap. Base station beams 205 and UE beams 210 may also be utilized simultaneously or at different times.

In some cases, a mapping may exist between a UE beam 210 used to receive downlink transmissions (e.g., a UE beam 210-a, which, in this instance, may be a downlink receive beam) and a UE beam 210 used for sending uplink transmissions (e.g., a UE beam 210-b, which may be an example of an uplink transmit beam). For example, base station 105-a may send a downlink transmission using base station beam 205-a and UE 115-a may receive the downlink transmission using UE beam 210-a. Based on the use of UE beam 210-a for receiving the downlink transmission, UE 115-a may then map a corresponding UE beam 210-b for sending an uplink transmission to base station 105-a, thereby creating a beam pair. In such cases, UE 115-a may be said to have beam correspondence.

In other cases, UE 115-a may not have beam correspondence. For instance, base station 105-a may send a downlink transmission using base station beam 205-a and UE 115-a may receive the downlink transmission on, for example, one or more sidelobes of UE beam 210-a or on UE beam 210-b (which, in this instance, may be a downlink receive beam). UE 115-a may then use another UE beam 210, that may not correspond (i.e., a mapping does not exist) to UE beam 210-a when sending an uplink transmission. In such cases, UE 115-a may be unable to determine a beam pairing (e.g., based on the angle of arrival of the downlink transmission or based on the downlink transmission being received in a different direction than UE beam 210-a).

In wireless communications system 200, UE 115-a may determine an uplink transmit power for a RACH transmission based on an estimated path loss (e.g., a path loss experienced during synchronization). UE 115-a may estimate a path loss and calculate an uplink transmit power for sending a RACH, for example, using Equation 1 described above. After determining an uplink transmit power, UE 115-a may then transmit a RACH transmission to base station 105-a at the determined transmit power level. However, base station 105-a may receive the RACH transmission from UE 115-a at an undesirable power level due to a mismatch between a beamforming gain associated with a downlink receive beam (e.g., a power gain of received signals associated with an antenna array), such as UE beam 210-a, and a beamforming gain associated with an uplink transmit beam (e.g., a power gain of transmitted signals associated with an antenna array), such as UE beam 210-b. For example, the beamforming gains associated with UE beam 210-a and UE beam 210-b may each have different power gain values (e.g., beam correspondence may not exist). In some examples, an angle of arrival associated with UE beam 210-a may be different than an angle of departure associated with UE beam 210-b and may result in the beamforming gain mismatch. Additionally or alternatively, an antenna element gain associated with a first direction (e.g., the direction of UE beam 210-a) may have a different value than the antenna element gain associated with a second direction (e.g., the direction of UE beam 210-b), which may result in the beamforming gain mismatch. As a result, base station 105-*a* may receive a RACH transmission from UE 115-*a* with a higher or lower power than desired. In some cases, receiving random access transmissions from UE 115-*a* at a power level above a desired power level may interfere with RACH preambles of another UE 115. In other cases, receiving a RACH from UE 115-*a* at a power level below a desired power level may not meet a link budget for transmission within wireless communications system 200.

As described herein, UE 115-*a* may adjust an uplink transmit power for a RACH transmission based on downlink and uplink beamforming gains. For instance, UE 115-*a* may use beamforming gains associated with UE beam 210-*a* (e.g., a downlink receive beam) and UE beam 210-*b* (e.g., an uplink transmit beam) to determine an uplink transmit power for a RACH transmission. In some examples, the beamforming gain for UE beam 210-*a* and/or the beamforming gain for UE beam 210-*b* may be based on a first array gain (e.g., a receive array gain) and/or a second array gain (e.g., a transmit array gain), respectively. For example, the beamforming gain for UE beam 210-*a* may equal the first array gain, and the beamforming gain for UE beam 210-*b* may equal the second array gain. In other examples, the beamforming gain for UE beam 210-*a* and/or the beamforming gain for UE beam 210-*b* may be equal to a combination of the first array gain and a first antenna element gain and/or a combination of the second array gain and a second antenna element gain, respectively. For example, the beamforming gain for UE beam 210-*a* may equal the summation of the first array gain and the first antenna element gain and the beamforming gain for UE beam 210-*b* may equal the summation of the second array gain and the second antenna element gain. The first antenna element gain may equal the second antenna element gain or the antenna element gains may be different values. In some cases, the antenna element gains may not be the same in all directions (e.g., the antenna element gain for the direction of the beam of UE beam 210-*a* may be different from the antenna element gain for the direction of UE beam 210-*b*).

In some cases, UE 115-*a* may calculate the uplink transmit power for the RACH transmission using a difference between the downlink and uplink beamforming gains in addition to a target preamble received power and an estimated path loss. For example, UE 115-*a* may determine an uplink transmit power for sending a RACH using the following equation:

$$P_{PRACH} = \min\{P_{CMAX_c}(i), \text{PREAMBLE\_RECEIVED\_TARGET\_POWER} + PL_c + \text{Beamforming\_Gain\_Difference}\} \text{ [dBm]} \quad (2)$$

where $P_{CMAX_c}(i)$ is the configured maximum transmit power for a subframe i of a serving cell c for UE 115-*a*, PREAMBLE_RECEIVED_TARGET_POWER is a desired receiving power of a PRACH preamble indicated by base station 105-*a*, $PL_C$ is the downlink path loss estimate determined by UE 115-*a* for the serving cell c, and Beamforming_Gain_Difference may be a power adjustment value (e.g., a power offset) corresponding to the difference between a beamforming gain for UE beam 210-*a* and a beamforming gain for UE beam 210-*b*. UE 115-*a* may add the power offset to a preamble received target power and estimated path loss to find the uplink transmit power. In other cases, the power offset may be subtracted to find the uplink transmit power.

Various adjustment procedures may be used for determining a power offset that is based on a difference between a beamforming gain for a downlink receive beam (e.g., UE beam 210-*a*) and a beamforming gain for an uplink transmit beam (e.g., UE beam 210-*b*). In one example, the power offset may be determined by subtracting a maximum beamforming gain of a selected downlink receive beam from a minimum beamforming gain of a selected uplink transmit beam, as shown in Equation 3.

$$\text{Beamforming\_Gain\_Difference} = \quad (3)$$
$$\text{Minimum\_Beamforming\_Gain\_Selected\_UL\_TX\_Beam} -$$
$$\text{Maximum\_Beamforming\_Gain\_Selected\_DL\_RX\_Beam}$$

Minimum_Beamforming_Gain_Selected_UL_TX_Beam represents the minimum beamforming gain of a selected UE beam 210-*b* used for uplink transmissions and Maximum_Beamforming_Gain_Selected_DL_RX_Beam represents the maximum beamforming gain of a selected UE beam 210-*a* used for receiving downlink transmissions. In some cases, the minimum beamforming gain may be a power gain at a sidelobe (e.g., in a direction with power gain lower than that of a mainlobe of a directional beam) of the transmitted beam or beam pattern, while the maximum beamforming gain may be a power gain at the mainlobe of a UE beam 210 (i.e., a direction of high power gain). In some examples, the maximum beamforming gain for UE beam 210-*a* may be greater than the minimum beamforming gain for UE beam 210-*b*, and the use of Beamforming_Gain_Difference according to Equation 3 may result (e.g., when used in Equation 2) in a relative reduction of $P_{PRACH}$ (e.g., as compared to calculating $P_{PRACH}$ without the Beamforming_Gain_Difference parameter).

In a second example, the power offset may be determined by subtracting the maximum beamforming gain of a selected downlink receive beam (such as UE beam 210-*a*) from a minimum beamforming gain of a crossover point of an uplink transmit beam (such as UE beam 210-*b*) as shown in Equation 4.

$$\text{Beamforming\_Gain\_Difference} = \quad (4)$$
$$\text{Minimum\_Beamforming\_Gain\_CrossOverPoint\_UL\_TX\_Beam} -$$
$$\text{Maximum\_Beamforming\_Gain\_Selected\_DL\_RX\_Beam}$$

Minimum_Beamforming_Gain_CrossOverPoint_UL_TX_Beam represents a minimum beamforming gain of a crossover point of UE beam 210-*b*. In some cases, the minimum beamforming gain of the crossover point may be a power gain at a point between the mainlobes of two beams. For example, UE 115-*a* may transmit using multiple UE beams 210 simultaneously, and a crossover point may be a point of relatively low power gain between the mainlobes of two UE beams 210. In some examples, the use of Beamforming_Gain_Difference as defined by Equation 4 may result in a $P_{PRACH}$ value that leads to a reduced uplink transmit power for transmitting RACH (e.g., as compared to calculating $P_{PRACH}$ without the Beamforming_Gain_Difference parameter).

In a third example, the power offset may be determined by subtracting the minimum beamforming gain of a selected UE beam 210-b for uplink transmission from the maximum beamforming gain of a selected UE beam 210-a for downlink reception, as shown in Equation 5.

$$\text{Beamforming\_Gain\_Difference} = \qquad (5)$$
$$\text{Maximum\_Beamforming\_Gain\_Selected\_DL\_RX\_Beam} -$$
$$\text{Minimum\_Beamforming\_Gain\_Selected\_UL\_TX\_Beam}$$

As mentioned above, the maximum beamforming gain for the receive beam may be greater than the minimum beamforming gain for the transmit beam. Accordingly, the Beamforming_Gain_Difference value defined by Equation 5 may result in an increased uplink transmit power for RACH transmissions (e.g., as compared to calculating $P_{PRACH}$ without the Beamforming_Gain_Difference parameter), which may enable UE 115-a to send RACH transmission that meet a link budget.

Additionally or alternatively, the power offset may be determined by subtracting the minimum beamforming gain of the crossover point of the selected uplink transmit beam (such as UE beam 210-b) from the maximum beamforming gain of the selected downlink receive beam (such as UE beam 210-a), as shown in Equation 6.

$$\text{Beamforming\_Gain\_Difference} = \qquad (6)$$
$$\text{Maximum\_Beamforming\_Gain\_Selected\_DL\_RX\_Beam} -$$
$$\text{Minimum\_Beamforming\_Gain\_CrossOverPoint\_UL\_TX\_Beam}$$

In some examples, the use of Beamforming_Gain_Difference as defined by Equation 6 may result in a $P_{PRACH}$ value that produces an increased uplink transmit power for a RACH transmission (e.g., as compared to calculating $P_{PRACH}$ without the Beamforming_Gain_Difference parameter), due to the maximum beamforming gain for the receive beam being greater than the minimum beamforming gain for the crossover point. It is noted that the Beamforming_Gain_Difference may be determined using other relationships between different beamforming gains for transmit and receive beams not explicitly disclosed herein.

The Beamforming_Gain_Difference may also be determined using fixed beamforming gains for the transmit and receive beams. For example, UE 115-a (e.g., not having beam correspondence) may assume a fixed beamforming gain for the receive beam, the transmit beam, or both. UE 115-a may also assume a maximum beamforming gain for the transmit beam, the receive beam, or both. For instance, the power offset (e.g., Beamforming_Gain_Difference) may be determined by a difference between a fixed beamforming gain for the transmit beam and a fixed beamforming gain for the receive beam. In other examples, the power offset may be determined according to a difference between the maximum beamforming gain for the receive beam and the fixed beamforming gain for the transmit beam. Additionally or alternatively, the power offset may be determined from a difference between a maximum beamforming gain for the transmit beam and the fixed beamforming gain for the receive beam. As an illustrative example, when using a difference between the maximum beamforming gain for the transmit beam (e.g., 9 dB for 8 transmit antenna elements) and the fixed beamforming gain for the receive beam (e.g., x dB), a transmit power used by UE 115-a for a RACH transmission may be backed off or adjusted by (9-x) dB. Base station 105-a may transmit an indication of the fixed beamforming gains to UE 115-a for use in estimating or determining Beamforming_Gain_Difference, where the indication may be sent using MIB, remaining minimum system information (RMSI), SIB1, other system information (OSI), RRC signaling, a handover command, a MAC-CE, DCI, etc.

The selection of the relationship between beamforming gains for the determination of Beamforming_Gain_Difference may be based on whether the uplink transmit power level is to be increased or decreased, and may be determined by UE 115-a or base station 105-a. As an example, Equation 3 or Equation 4 may be used to determine an uplink transmit power when an uplink transmit power is to be decreased (e.g., to prevent RACH transmissions from UE 115-a from interfering with communications by other UEs 115). In another example, Equation 5 or Equation 6 may be used when an uplink transmit power is to be increased (e.g., to ensure a RACH transmission from UE 115-a meets a certain link budget). In some cases, UE 115-a may determine which adjustment procedure (e.g., which of equations 3 through 6) to use when determining the Beamforming_Gain_Difference, where UE 115-a may be preconfigured to use any one of multiple adjustment procedures. In other cases, base station 105-a may signal (e.g., through MIB, RMSI, OSI, SIB1, RRC signaling, a handover command, MAC-CE, DCI, etc.) a procedure (e.g., using one of equations 3 through 6 above) or value for UE 115-a to use when determining Beamforming_Gain_Difference. For instance, base station 105-a may explicitly signal a power offset value that UE 115-a may use as an estimate of the transmit beamforming gain, or the receive beamforming gain, or both. Base station 105-a may inform UE 115-a to use a particular power offset for determining the uplink transmit power for a RACH transmission, such as for contention-free random access procedures.

In some examples, UE 115-a may determine an uplink transmit power for a RACH transmission without using the beamforming gains. In such cases, UE 115-a may determine to adjust an uplink transmit power for a RACH transmission based on whether UE 115-a has beam correspondence. For example, UE 115-a may not have beam correspondence and may be configured to adjust an uplink transmit power for a RACH transmission based on the absence of beam correspondence. Accordingly, base station 105-a may send an indication of a power offset to UE 115-a, where UE 115-a may back off the transmit power by a certain amount based on the power offset received in the indication.

Base station 105-a may request that UE 115-a adjust an uplink transmit power used for a random access procedure.

In some cases, base station 105-a may send an indication to UE 115-a requesting that UE 115-a adjust its uplink transmit power used for a PRACH based on whether UE 115-a has beam correspondence (or not). For example, base station 105-a may use an indication to instruct UE 115-a to adjust a transmit power for random access procedures based on a lack of beam correspondence at UE 115-a. An indication requesting an uplink transmit power adjustment may be sent in a MIB, RMSI, OSI, SIB1, SIB2, RRC signaling, a handover command, MAC-CE, DCI, etc. In other cases, base station 105-a may request that UE 115-a adjust its uplink transmit power used for a PRACH based on a measured level of interference (e.g., from UE 115-a). For example, base station 105-a may request that UE 115-a add a power offset to an uplink transmit power if the uplink transmit power does not meet a predetermined link budget or if the measured level of interference is below a predetermined threshold. In other cases, base station 105-a may request that UE 115-a subtract a power offset from an uplink transmit power if a measured interference level is above a predetermined threshold.

Figure 3:
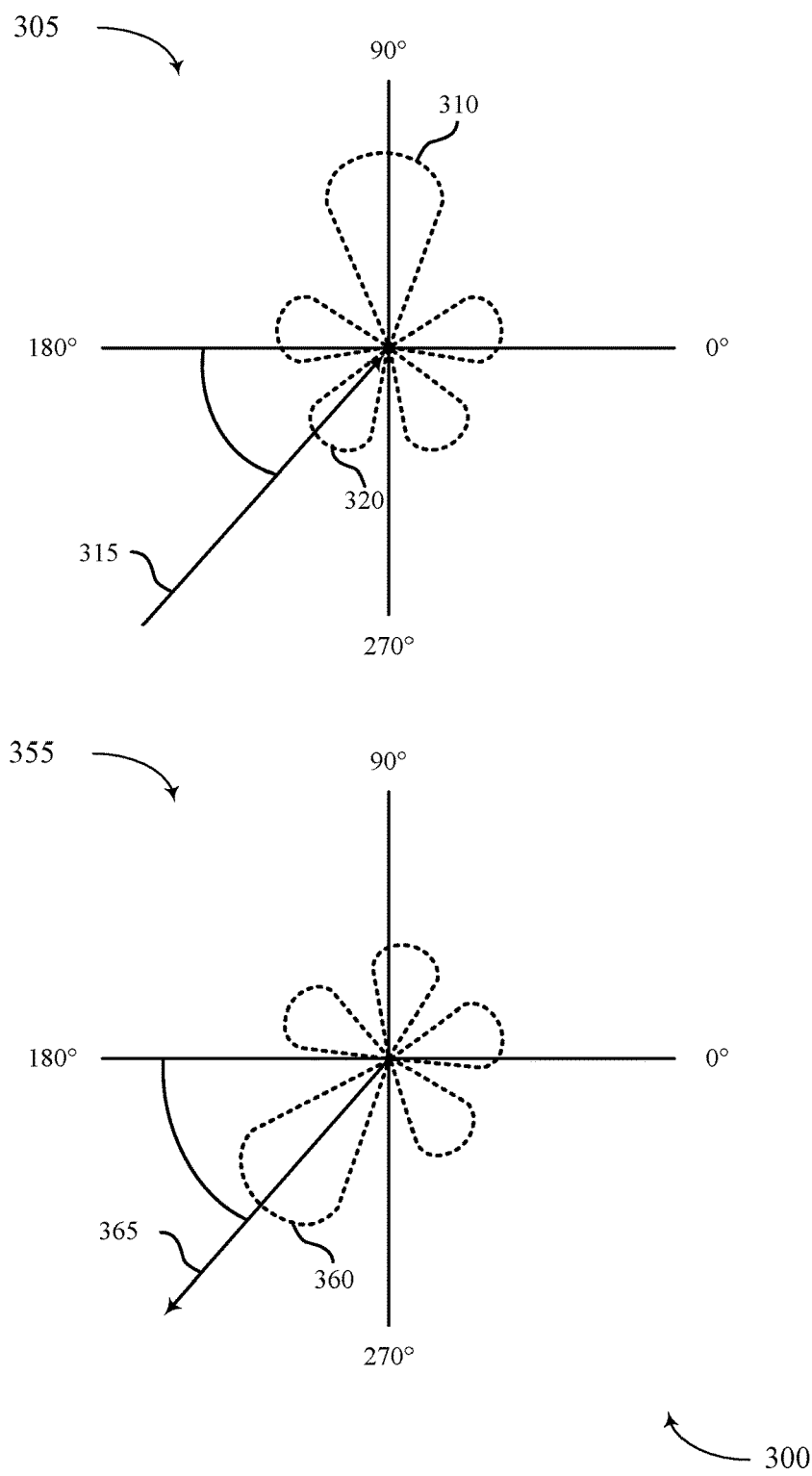
FIGS. 3 through 5 illustrate examples of directional beams in a system that supports uplink transmit power control during random access procedures in accordance with aspects of the present disclosure.

FIG. 3 illustrates an example of directional beams 300 in a system that supports uplink transmit power control during random access procedures in accordance with various aspects of the present disclosure. Directional beams 300 illustrate an example of different directions or orientations for a set of downlink receive beams 305 and a set of uplink transmit beams 355, where different lobes of the downlink receive beams 305 and uplink transmit beams 355 may be associated with different beamforming gains. Directional beams 300 may be an example of different beams having different beamforming gains, which may be used for the calculation of an uplink transmit power.

In some cases, directional beams 300 may represent a set of downlink receive beams 305 and a set of uplink transmit beams 355 for a UE 115. UE 115 may lack beam correspondence. That is, a mapping may not exist between one of downlink receive beams 305 (e.g., a mainlobe 310) and one of uplink transmit beams 355 (e.g., mainlobe 360). Accordingly, the power gain for downlink receive beams 305 and uplink transmit beams 355 may have different values at a given angle.

Angle of arrival 315 may represent an angle at which a downlink transmission (such as a synchronization signal) sent by a base station 105 is received by a UE 115 using receive beams 305. In some examples, angle of arrival 315 may not correspond to mainlobe 310 of downlink receive beams 305, and instead may correspond to a sidelobe 320 of downlink receive beams 305. Additionally, angle of departure 365 may represent an angle at which an uplink transmission (such as a RACH transmission) is sent by the UE 115 to the base station 105 using transmit beams 355. In some examples, angle of departure 365 may correspond to an uplink transmit beam having a maximum transmit beamforming gain (e.g., corresponding to mainlobe 360). Without the use of a transmit power that considers the absence/presence of beam correspondence at the UE 115 or beamforming gain differences (or both), a RACH transmission sent by the UE 115 may be at a higher power level than desired and may interfere with transmissions of other UEs 115. Accordingly, the UE 115 may adjust its uplink transmit power (e.g., to decrease the transmit power) for a RACH transmission based on a difference of beamforming gains for downlink receive beams 305 and uplink transmit beams 355.

For example, a UE 115 may use a beamforming gain associated with sidelobe 320 (e.g., selected due to its correspondence with angle of arrival 315) and a beamforming gain for mainlobe 360 (e.g., selected due to its correspondence with angle of departure 365) for determining an uplink transmit power. The power offset may be determined based on a difference between the respective beamforming gains for sidelobe 320 and mainlobe 360. As an example, and as described above, the power offset may be determined by subtracting a maximum beamforming gain corresponding to sidelobe 320 of downlink receive beams 305 from a minimum beamforming gain corresponding to mainlobe 360 of uplink transmit beams 355 (e.g., using Equation 3, as described with reference to FIG. 2). The determined power offset may then be added to a preamble received target power and an estimated path loss to determine an uplink transmit power to use for a RACH transmission. The resulting transmit power may prevent the UE 115 from transmitting a RACH preamble with excessive or unnecessary power.

Figure 4:
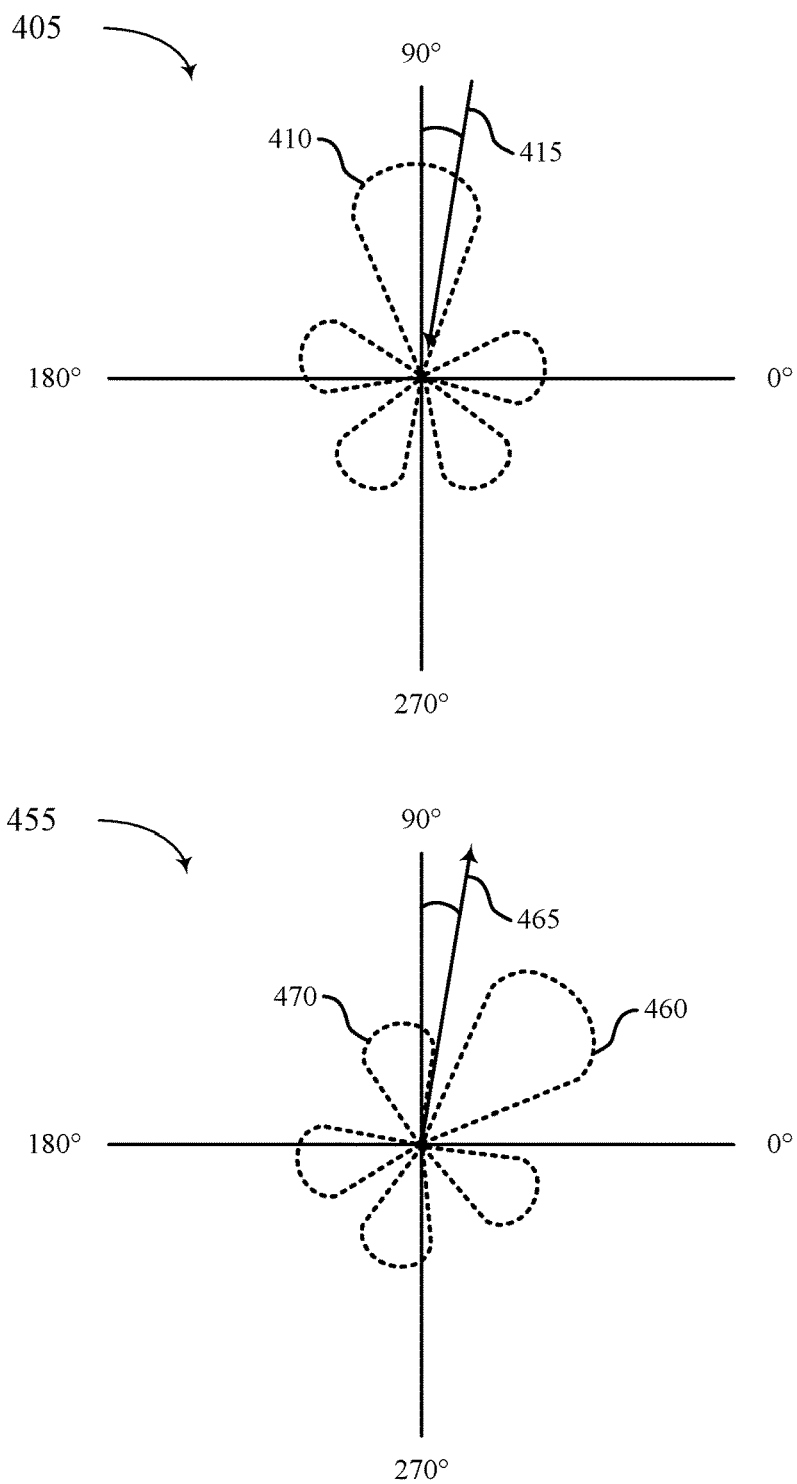

FIG. 4 illustrates an example of directional beams 400 in a system that supports uplink transmit power control during random access procedures in accordance with various aspects of the present disclosure. Directional beams 400 illustrate an example of different directions or orientations for a set of downlink receive beams 405 and a set of uplink transmit beams 455, where different lobes of the downlink receive beams 405 and uplink transmit beams 450 may be associated with different beamforming gains. Directional beams 400 may be an example of different beams having different beamforming gains, which may be used for the calculation of an uplink transmit power.

In some cases, directional beams 400 may represent a set of downlink receive beams 405 and a set of uplink transmit beams 455 for a UE 115 without beam correspondence. That is, a mapping may not exist between one of downlink receive beams 405 (e.g., a mainlobe 410) and one of uplink transmit beams 455 (e.g., mainlobe 460). Accordingly, the power gain for downlink receive beams 405 and uplink transmit beams 455 may have different values at a given angle.

Angle of arrival 415 may represent an angle at which a downlink transmission sent by a base station 105 is received by a UE 115 using receive beams 405. In some examples, angle of arrival 415 may correspond to mainlobe 410 of downlink receive beams 405. Additionally, angle of departure 465 may represent an angle at which an uplink transmission (such as a RACH transmission) is sent by the UE 115 to the base station 105 using transmit beams 455. In some examples, angle of departure 465 may not directly correspond to an uplink transmit beam having a maximum transmit beamforming gain (e.g., corresponding to mainlobe 460), and instead may correspond to one or more sidelobes 470 of downlink receive beams 455. Without the use of a transmit power that considers the absence/presence of beam correspondence at the UE 115 or beamforming gain differences (or both), a RACH transmission sent by the UE 115 may be at a lower power level than desired and may not meet a link budget for messages sent during random access procedures. Accordingly, the UE 115 may adjust its uplink transmit power (e.g., to increase the transmit power) for a RACH transmission based on a difference of beamforming gains for downlink receive beams 405 and uplink transmit beams 455.

For example, a UE 115 may use a beamforming gain associated with mainlobe 410 (e.g., selected due to its correspondence with angle of arrival 415) and a beamforming gain for sidelobe 470 (e.g., selected due to its correspondence with angle of departure 465) for determining an uplink transmit power. The power offset may be determined based on a difference between the beamforming gains for mainlobe 410 and sidelobe 470. As an example, and as described above, the power offset may be determined by subtracting a minimum beamforming gain corresponding to sidelobe 470 of uplink transmit beams 405 from a maximum beamforming gain corresponding to mainlobe 410 of downlink receive beams 405 (e.g., using Equation 5, as described with reference to FIG. 2). The determined power offset may then be added to a preamble received target power and an estimated path loss to determine an uplink transmit power to use for a RACH transmission. The resulting transmit power may ensure the RACH transmission sent by the UE 115 is received at the base station 105 with sufficient power to be received, thereby enabling a RACH response from the base station 105 and a subsequent grant of resources.

Figure 5:
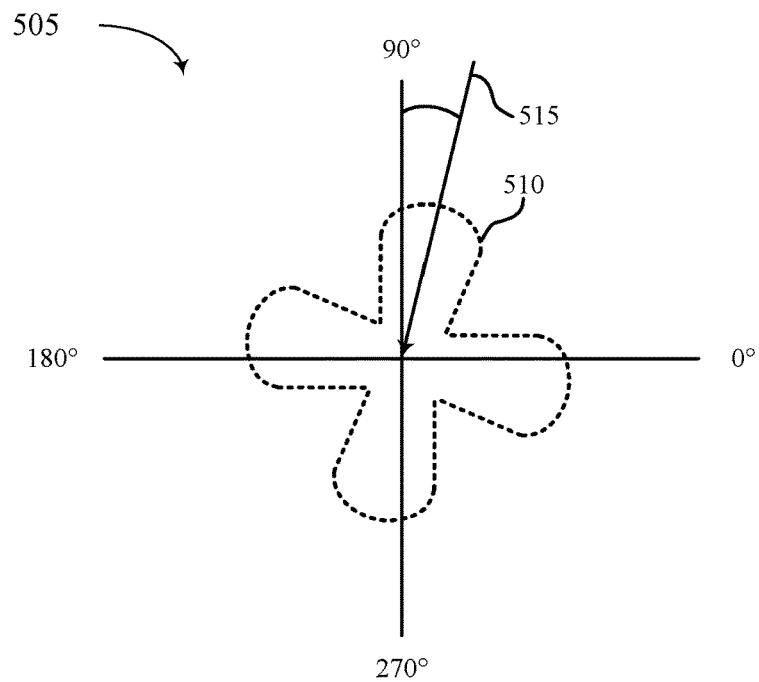
Figure 5:
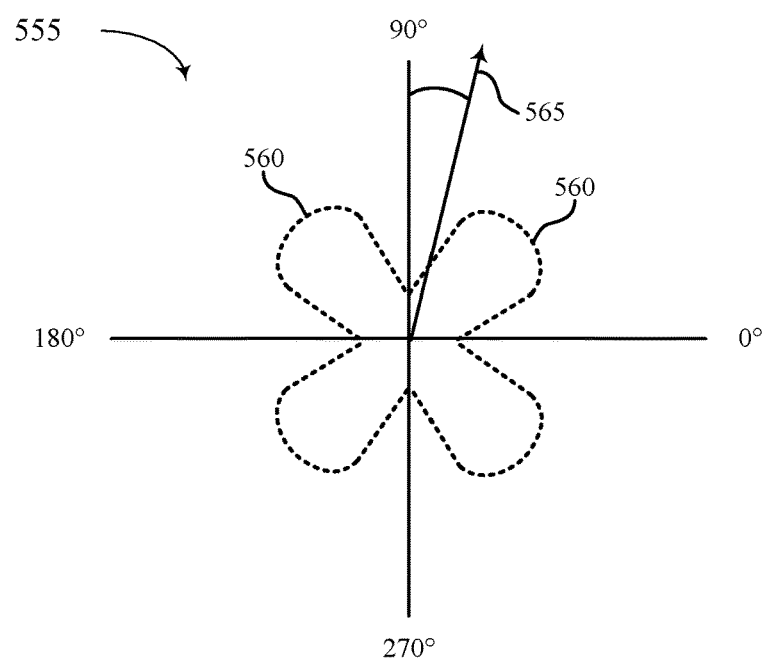

FIG. 5 illustrates an example of directional beams 500 in a system that supports uplink transmit power control during random access procedures in accordance with various aspects of the present disclosure. Directional beams 500 illustrate an example of different directions or orientations for a set of downlink receive beams 505 and a set of uplink transmit beams 555, where different lobes of the downlink receive beams 505 and uplink transmit beams 555 may be associated with different beamforming gains. Directional beams 500 may be an example of different beams having different beamforming gains, which may be used for the calculation of an uplink transmit power.

In some cases, directional beams 500 may represent a set of downlink receive beams 505 and a set of uplink transmit beams 555 for a UE 115 without beam correspondence. That is, a mapping may not exist between downlink receive beams 505 and uplink transmit beams 555. As an example, directional beams 500 shows multiple downlink receive beams 505 and multiple uplink transmit beams 555, where multiple mainlobes 510 and mainlobes 560 are formed for receiving and transmitting, respectively. Additionally, the downlink receive beams 505 and uplink receive beams 555 may include all of the transmit and receive beams, respectively, of the UE 115. The power gain for downlink receive beams 505 and uplink transmit beams 555 may have different values at a given angle.

Angle of arrival 515 may represent an angle at which a downlink transmission sent by a base station 105 is received by the UE 115 using receive beams 505. In some examples, angle of arrival 515 may correspond to at least one mainlobe 510 of downlink receive beams 505. Additionally, angle of departure 565 may represent an angle at which an uplink transmission (such as a RACH transmission) is sent by the UE 115 to the base station 105 using transmit beams 555. In some examples, angle of departure 565 may not directly correspond to an uplink transmit beam having a maximum transmit beamforming gain (e.g., corresponding to at least one mainlobe 560), and instead may correspond to a crossover point of downlink receive beams 555 (e.g., a location between mainlobes 560 where a power gain is less than that of a mainlobe 560). Without the use of procedure for calculating uplink transmit power that accounts for the absence/presence of beam correspondence at the UE or beamforming gain differences (or both absence/presence of beam correspondence and beamforming gain differences), a RACH transmission sent by the UE 115 may be at a lower power level than desired and may not meet a link budget for messages sent during random access procedures. As a result, the UE 115 may adjust its uplink transmit power (e.g., to increase the transmit power) for a RACH transmission based on a difference of beamforming gains for downlink receive beams 505 and uplink transmit beams 555.

For example, a UE 115 may use a beamforming gain associated with mainlobe 510 (e.g., selected due to its correspondence with angle of arrival 515) and a beamforming gain for a crossover point between mainlobes 560 (e.g., selected due to its correspondence with angle of departure 565) for determining an uplink transmit power. The power offset may be determined based on a difference between the beamforming gains for mainlobe 510 and the crossover point. As an example, and as described above, the power offset may be determined by subtracting a minimum beamforming gain corresponding to the crossover point of uplink transmit beams 505 from a maximum beamforming gain corresponding to mainlobe 510 of downlink receive beams 505 (e.g., using Equation 6, as described with reference to FIG. 2). The determined power offset may then be added to a preamble received target power and an estimated path loss to determine an uplink transmit power to use for a RACH transmission. The resulting transmit power may ensure the RACH transmission sent by the UE 115 is received at the base station 105 with sufficient power to be received, thereby enabling a RACH response from the base station 105 and a subsequent grant of resources.

Figure 6:
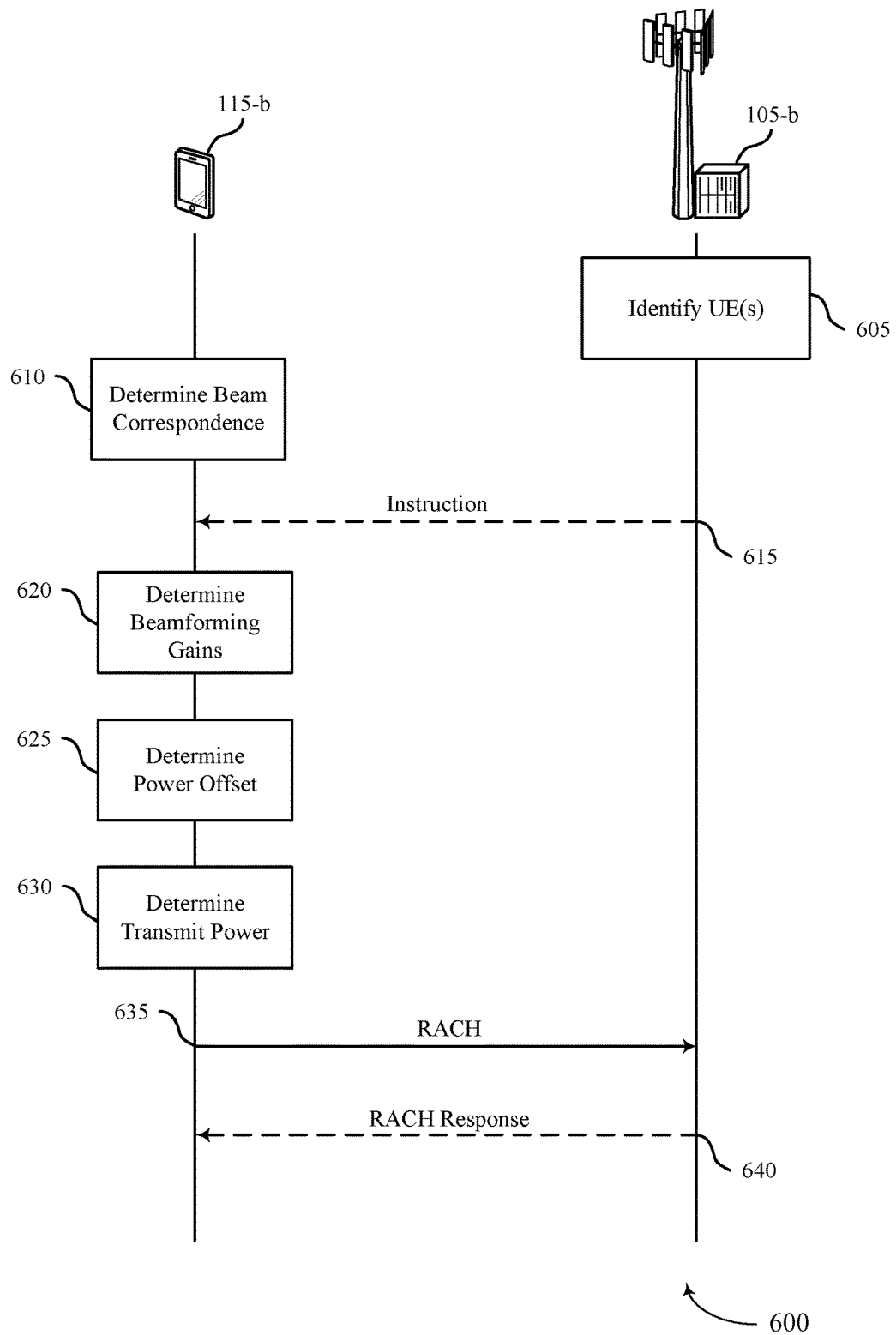
FIG. 6 illustrates an example of a process flow in a system that supports uplink transmit power control during random access procedures in accordance with aspects of the present disclosure.

FIG. 6 illustrates an example of a process flow 600 in a system that supports uplink transmit power control during random access procedures in accordance with various aspects of the present disclosure. In some examples, process flow 600 may implement aspects of wireless communications system 100. For example, process flow 600 includes a UE 115-b and base station 105-b, which may be examples of the corresponding devices as described with reference to FIGS. 1 and 2. Process flow 600 may illustrate an example of uplink transmit power adjustment based on downlink and uplink beamforming gains, or based on beam correspondence at UE 115-b, or both.

At 605, base station 105-b may identify one or more UEs 115 (e.g., including UE 115-b), where the one or more UEs 115 may operate using directional transmissions, and thus have a transmit beam and a receive beam. At 610, UE 115-b may determine a presence of beam correspondence. For example, UE 115-b may determine a beam correspondence state indicating a correspondence (or the absence of a correspondence) between one or more uplink transmit beams, including the transmit beam, and one or more downlink receive beams, including the receive beam. Accordingly, UE 115-b may identify whether a mapping exists between a downlink receive beam and an uplink transmit beam being used for communications. If such a mapping exists, UE 115-b may determine that beam correspondence is present for UE 115-b. Otherwise, UE 115-b may not have beam correspondence.

At 615, base station 105-b may optionally transmit instruction to UE 115-b to adjust an uplink transmit power for an uplink random access (e.g., RACH) transmission. In some cases, base station 105-b may send the request for adjusting the uplink transmit power so UE 115-b may adjust the transmit power based on whether beam correspondence is present at UE 115-b. In some cases, base station 105-b may also indicate to UE 115-b a power offset (e.g., which of Equations 3 through 6) to use when determining the uplink transmit power. In other cases, base station 105-b may request that UE 115-b adjust an uplink transmit power used for a RACH transmission based on a measured level of interference. For example, base station 105-b may request that UE 115-b decrease an uplink transmit power if a measured level of interference does not satisfy a threshold level or increase the uplink transmit power when the level of interference satisfies the threshold level. Base station 105-b may indicate, using the instruction, various power offset values or beamforming gain (e.g., including fixed beamforming gains) for use in determining an uplink transmit power. In some cases, the instruction may be sent in a MIB, RMSI, OSI, SIB, RRC signaling, a handover command, MAC-CE, DCI, etc.

At 620, UE 115-b may determine beamforming gains associated with transmit and receive beams utilized at UE 115-b. For instance, UE 115-b may determine a transmit beamforming gain for a transmit beam of UE 115-b and determine a receive beamforming gain for a receive beam of UE 115-b. At 625, UE 115-b may identify a power offset for determining or adjusting an uplink transmit power for a RACH transmission. In some cases, UE 115-b may identify a power offset value after receiving the instruction from base station 105-b at 615. In other cases, UE 115-b may identify the power offset based on a presence of beam correspondence. For example, if UE 115-b determines that beam correspondence does not exist, for example at 610, UE 115-b may be configured to identify the power offset value. In some cases, the power offset value identified may be based on downlink and uplink (receive and transmit) beamforming gains. For example, UE 115-b may use a difference in beamforming gains (e.g., Equations 3 through 6) or differences in beamforming gains that include fixed beamforming gains for identifying a power offset value.

At 630, UE 115-b may adjust an uplink transmit power for a PRACH. For example, UE 115-b may adjust an uplink transmit power for a PRACH based on the power offset value identified at 625. UE 115-b may then use the identified power offset value along with a preamble received target power and an estimated path loss to find an uplink transmit power (e.g., using Equation 2). In some cases, UE 115-b may be configured to adjust an uplink transmit power based on a relationship between downlink and uplink beamforming gains or UE 115-b may determine to adjust an uplink transmit power based on signaling received from base station 105-b at 615. In other examples, UE 115-b may determine the transmit power without using the determined beamforming gains, and may instead determine the transmit power based on a presence or absence of beam correspondence. Additionally or alternatively, UE 115-b may use a power offset based on interference between UE 115-b and base station 105-b for determining a transmit power for a random access transmission.

At 635, UE 115-b may transmit the uplink random access transmission to base station 105-b. In such cases, the uplink random access transmission includes a message transmitted on a PRACH during a random access procedure. Additionally, UE 115-b may send the uplink random access transmission at an uplink transmit power level determined at 630, and base station 105-b may receive the transmitted RACH. At 640, base station 105-b may send a random access response to UE 115-b, which may contain information to facilitate communications between UE 115-b and base station 105-b.

Figure 7:
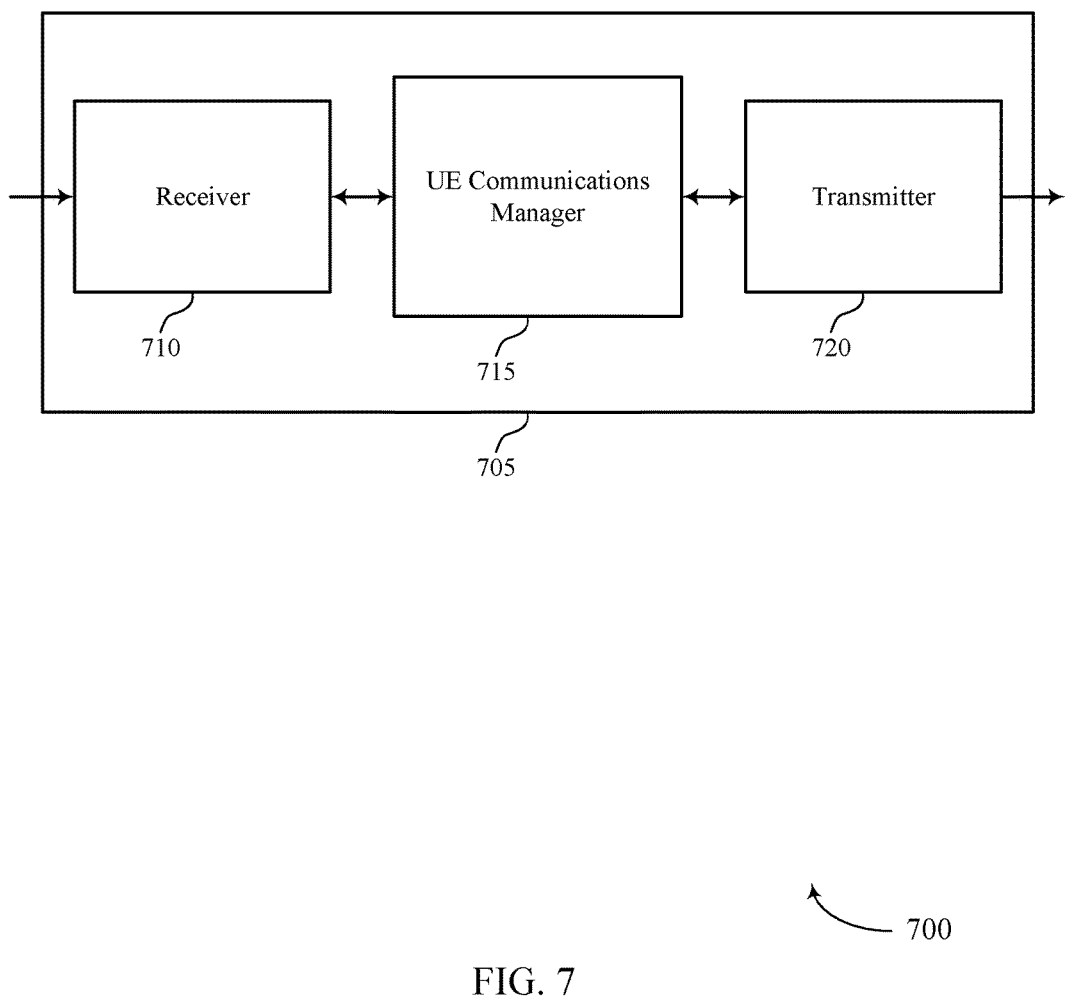
FIGS. 7 through 9 show block diagrams of a device that supports uplink transmit power control during random access procedures in accordance with aspects of the present disclosure.

FIG. 7 shows a block diagram 700 of a wireless device 705 that supports uplink transmit power control during random access procedures in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink transmit power control during random access procedures, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may determine a transmit beamforming gain for a transmit beam of the UE 115, determine a receive beamforming gain for a receive beam of the UE 115, determine a transmit power for an uplink random access transmission based on the determined transmit beamforming gain and the determined receive beamforming gain, and transmit the uplink random access transmission using the determined transmit power.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
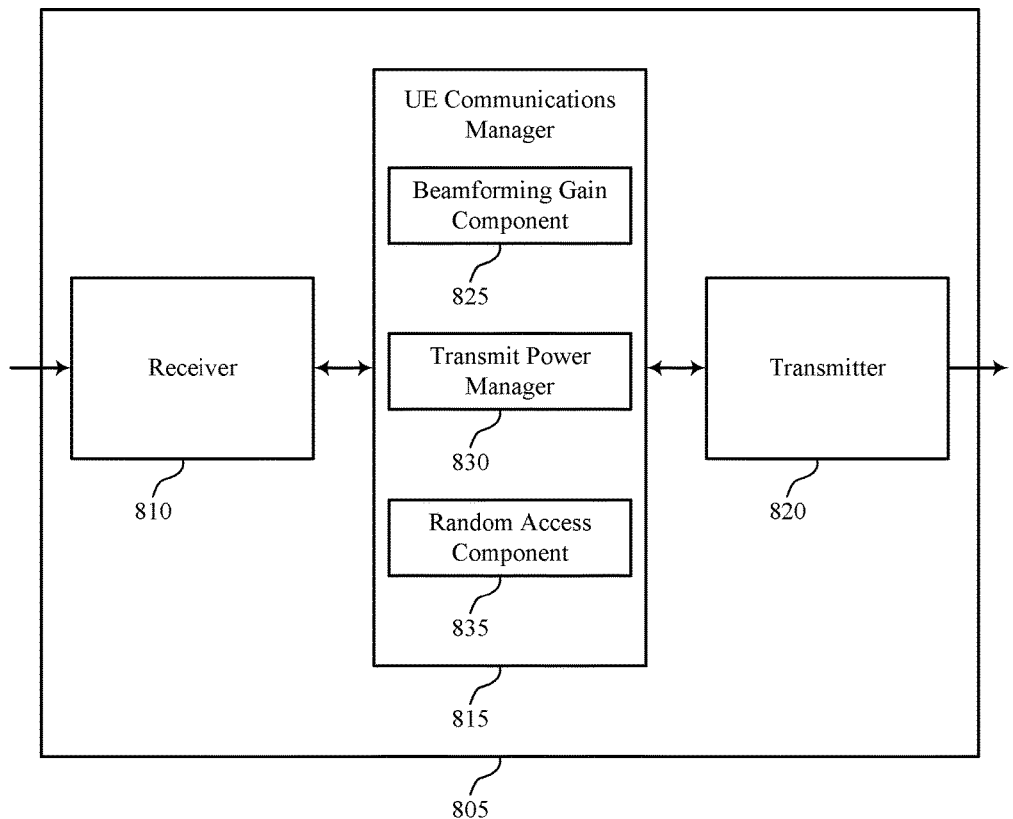

FIG. 8 shows a block diagram 800 of a wireless device 805 that supports uplink transmit power control during random access procedures in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink transmit power control during random access procedures, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include beamforming gain component 825, transmit power manager 830, and random access component 835.

Beamforming gain component 825 may determine a transmit beamforming gain for a transmit beam of a UE 115 and determine a receive beamforming gain for a receive beam of the UE 115. In some cases, a beamforming gain difference between the transmit beamforming gain and the receive beamforming gain may be determined or estimated by the UE 115. In some cases, the beamforming gain difference includes a difference between a minimum beamforming gain for the transmit beam and a maximum beamforming gain for the receive beam. In some cases, the beamforming gain difference includes a difference between a minimum crossover point beamforming gain for a set of transmit beams, including the transmit beam, and a maximum beamforming gain for a set of receive beams, including the receive beam.

In some cases, the set of transmit beams include all transmit beams of the UE 115, and the set of receive beams may include all receive beams of the UE 115. Additionally or alternatively, the beamforming gain difference includes a difference between a fixed beamforming gain for the transmit beam and a fixed beamforming gain for the receive beam. In some cases, the beamforming gain difference includes a difference between a maximum beamforming gain for the transmit beam and a fixed beamforming gain for the receive beam. In other examples, the beamforming gain difference includes a difference between a fixed beamforming gain for the transmit beam and a maximum beamforming gain for the receive beam. In some cases, the transmit beamforming gain includes a transmit array gain, or a first antenna element gain, or a combination thereof. Additionally, the receive beamforming gain may include a receive array gain, or a second antenna element gain, or a combination thereof. In some examples, the transmit beamforming gain may include a summation of the transmit array gain and the first antenna element gain, and the receive beamforming gain may include a summation of the receive array gain and the second antenna element gain.

Transmit power manager 830 may determine a transmit power for an uplink random access transmission based on the determined transmit beamforming gain and the determined receive beamforming gain. In some examples, transmit power manager 830 may determine the transmit power based on the determined beamforming gain difference. In some cases, the transmit power is further based on a target preamble received power, an estimated path loss, and a maximum transmit power for the UE 115. In some examples, transmit power manager 830 may adjust the transmit power based on an identified adjustment procedure. Additionally or alternatively, transmit power manager 830 may receive, from a base station 105, an instruction to adjust the transmit power based on the determined beam correspondence state.

In some cases, determining the transmit power includes determining a beamforming gain difference between the transmit beamforming gain and the receive beamforming gain. In some cases, determining the transmit power further includes adding the determined beamforming gain difference to a sum of the target preamble received power and the estimated path loss. In other cases, determining the transmit power further includes subtracting the determined beamforming gain difference from a sum of the target preamble received power and the estimated path loss. In some cases, the instruction is received in a MIB, an RMSI, an OSI, a SIB (e.g., SIB1 or SIB2), RRC signaling, a handover command, a MAC-CE, DCI, or a combination thereof. In some cases, transmit power manager 830 may receive an indication of a power offset from a base station 105, and determining the transmit power for the uplink random access transmission may include applying the power offset based on a beam correspondence state. Random access component 835 may transmit the uplink random access transmission using the determined transmit power. In some cases, the uplink random access transmission includes a message transmitted on a PRACH during a random access procedure.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
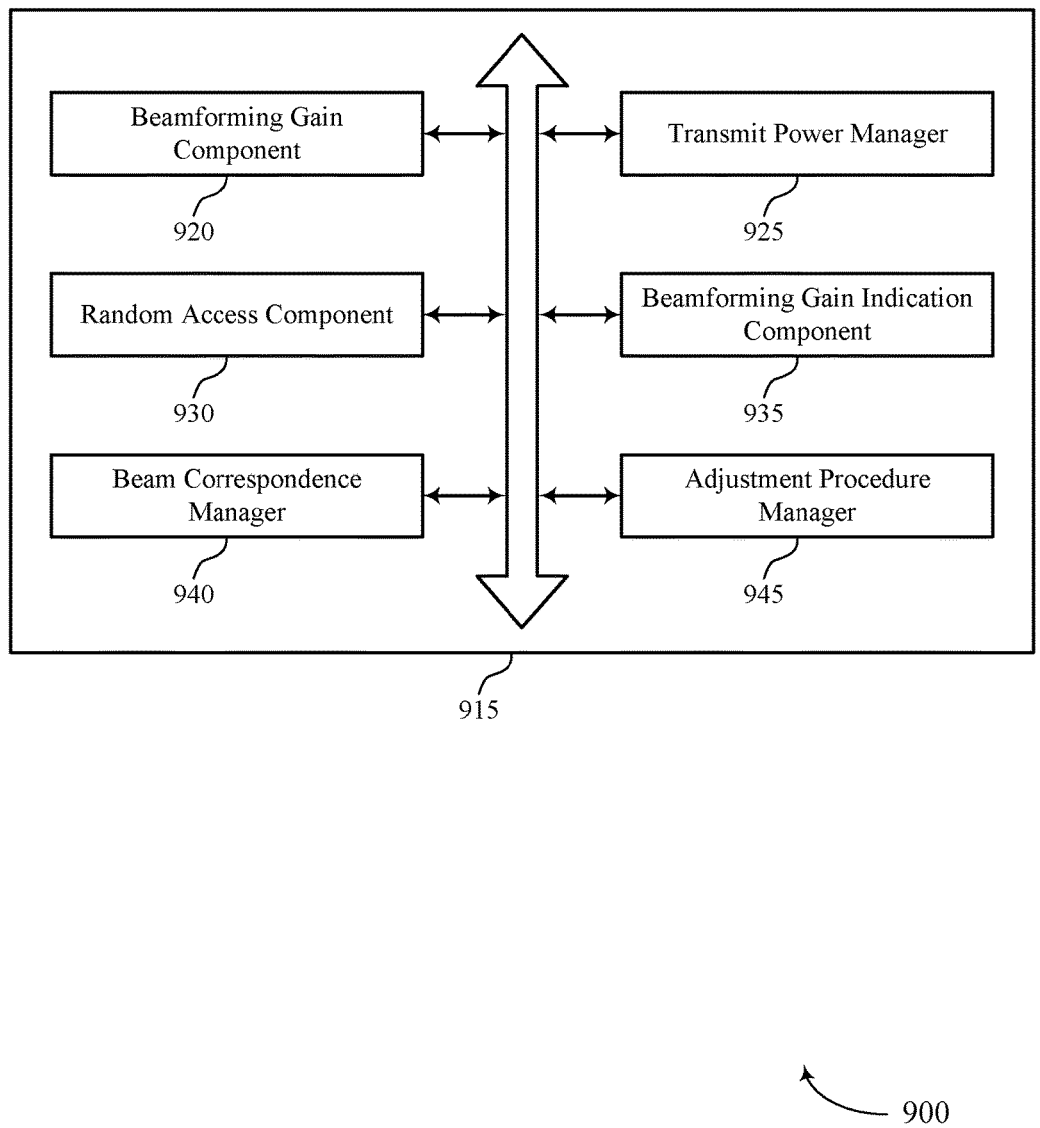

FIG. 9 shows a block diagram 900 of a UE communications manager 915 that supports uplink transmit power control during random access procedures in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include beamforming gain component 920, transmit power manager 925, random access component 930, beamforming gain indication component 935, beam correspondence manager 940, and adjustment procedure manager 945. Each of these modules may communicate, directly or indirectly, with one another (e.g., via one or more buses).

Beamforming gain component 920 may determine a transmit beamforming gain for a transmit beam of a UE 115 and determine a receive beamforming gain for a receive beam of the UE 115. In some cases, a beamforming gain difference between the transmit beamforming gain and the receive beamforming gain may be determined or estimated by the UE 115. In some cases, the beamforming gain difference includes a difference between a minimum beamforming gain for the transmit beam and a maximum beamforming gain for the receive beam. In some cases, the beamforming gain difference includes a difference between a minimum crossover point beamforming gain for a set of transmit beams, including the transmit beam, and a maximum beamforming gain for a set of receive beams, including the receive beam. In some cases, the set of transmit beams includes all transmit beams of the UE 115, and the set of receive beams may include all receive beams of the UE 115. Additionally or alternatively, the beamforming gain difference includes a difference between a fixed beamforming gain for the transmit beam and a fixed beamforming gain for the receive beam. In some cases, the beamforming gain difference includes a difference between a maximum beamforming gain for the transmit beam and a fixed beamforming gain for the receive beam. In other examples, the beamforming gain difference includes a difference between a fixed beamforming gain for the transmit beam and a maximum beamforming gain for the receive beam.

Transmit power manager 925 may determine a transmit power for an uplink random access transmission based on the determined transmit beamforming gain and the determined receive beamforming gain. In some examples, transmit power manager 925 may determine the transmit power based on the determined beamforming gain difference. In some cases, the transmit power is further based on a target preamble received power, an estimated path loss, and a maximum transmit power for the UE 115. In some examples, transmit power manager 925 may adjust the transmit power based on an identified adjustment procedure. Additionally or alternatively, transmit power manager 925 may receive, from a base station 105, an instruction to adjust the transmit power based on the determined beam correspondence state.

In some cases, determining the transmit power includes determining a beamforming gain difference between the transmit beamforming gain and the receive beamforming gain. In some cases, determining the transmit power further includes adding the determined beamforming gain difference to a sum of the target preamble received power and the estimated path loss. In some cases, determining the transmit power further includes subtracting the determined beamforming gain difference from a sum of the target preamble received power and the estimated path loss. In some cases, the instruction is received in a MIB, an RMSI, an OSI, a SIB (e.g., SIB1 or SIB2), RRC signaling, a handover command, a MAC-CE, DCI, or a combination thereof. In some cases, transmit power manager 925 may receive an indication of a power offset from a base station 105, and determining the transmit power for the uplink random access transmission may include applying the power offset based on a beam correspondence state.

Random access component 930 may transmit the uplink random access transmission using the determined transmit power. In some cases, the uplink random access transmission includes a message transmitted on a PRACH during a random access procedure.

Beamforming gain indication component 935 may receive, from a base station 105, an indication of the fixed beamforming gain for the transmit beam, or the fixed beamforming gain for the receive beam, or a combination thereof, where the indication is received in an MIB, RMSI, OSI, SIB, RRC signaling, a handover command, a MAC-CE, DCI, or a combination thereof.

Beam correspondence manager 940 may determine a beam correspondence state indicating a correspondence between one or more uplink transmit beams, including the transmit beam, and one or more downlink receive beams, including the receive beam. In some examples, adjusting the transmit power is based on the determined beam correspondence state. Adjustment procedure manager 945 may identify one of a set of adjustment procedures to use to adjust the transmit power for the uplink random access transmission based on the determined transmit beamforming gain and the determined receive beamforming gain.

Figure 10:
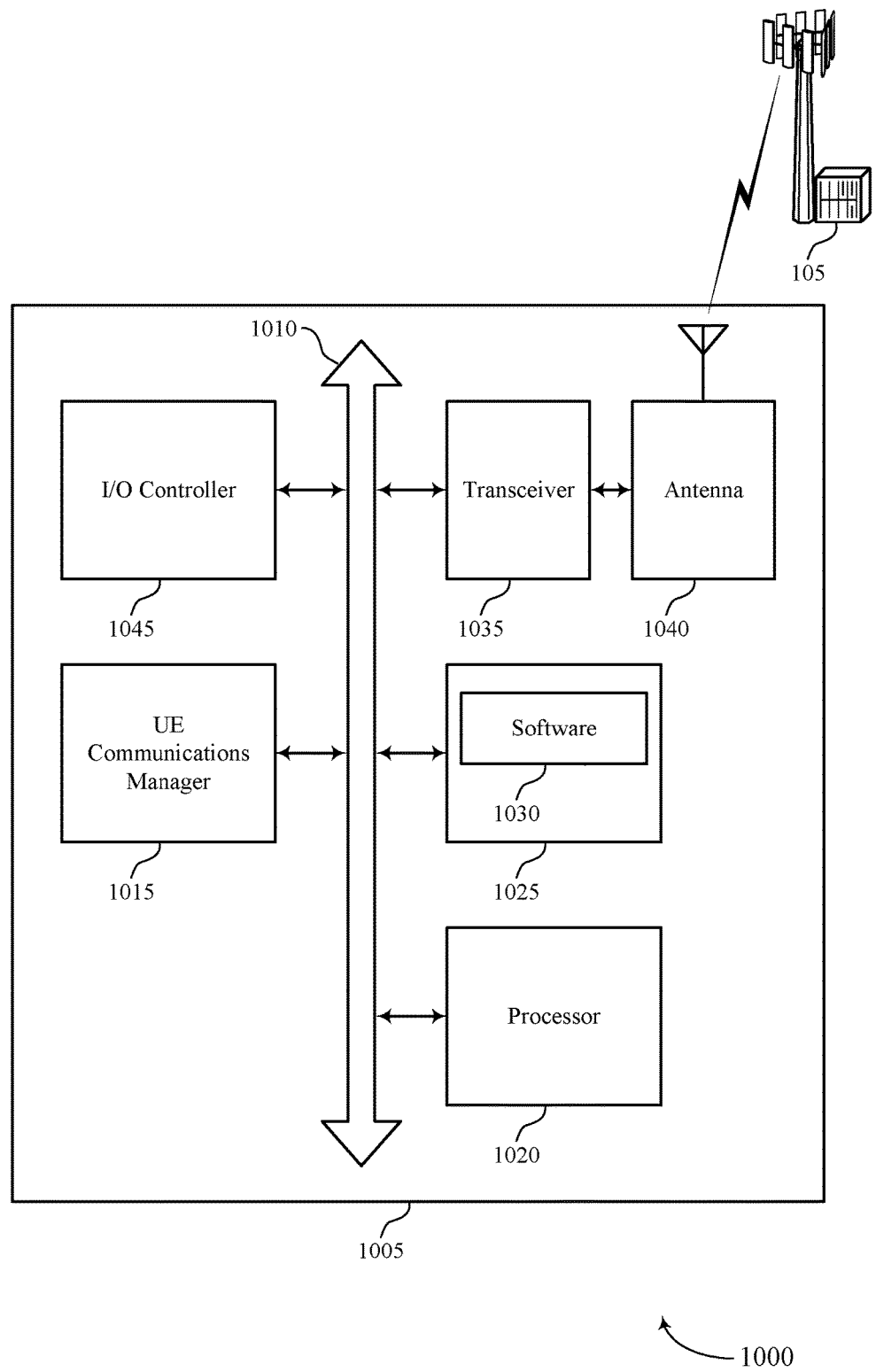
FIG. 10 illustrates a block diagram of a system including a UE that supports uplink transmit power control during random access procedures in accordance with aspects of the present disclosure.

FIG. 10 shows a diagram of a system 1000 including a device 1005 that supports uplink transmit power control during random access procedures in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting uplink transmit power control during random access procedures).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support uplink transmit power control during random access procedures. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
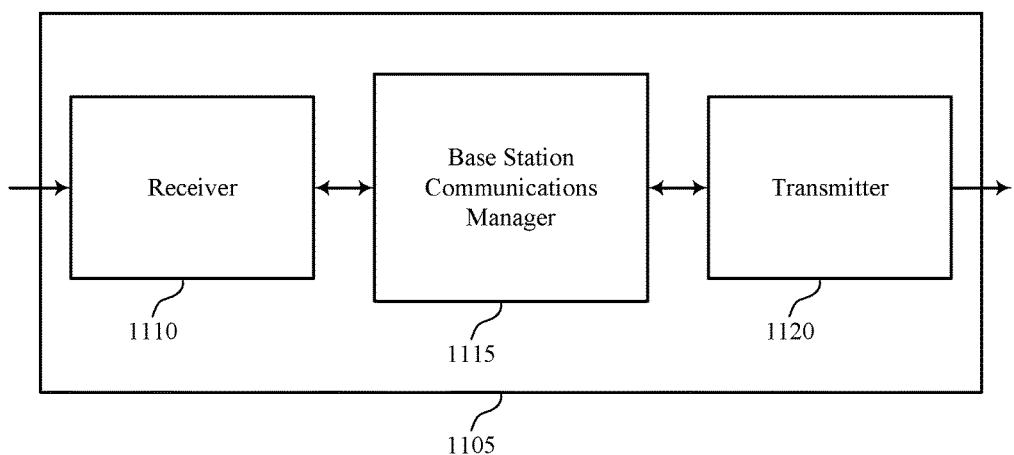
FIGS. 11 through 13 show block diagrams of a device that supports uplink transmit power control during random access procedures in accordance with aspects of the present disclosure.

FIG. 11 shows a block diagram 1100 of a wireless device 1105 that supports uplink transmit power control during random access procedures in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink transmit power control during random access procedures, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a UE 115, the UE 115 having a transmit beam and a receive beam, and transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
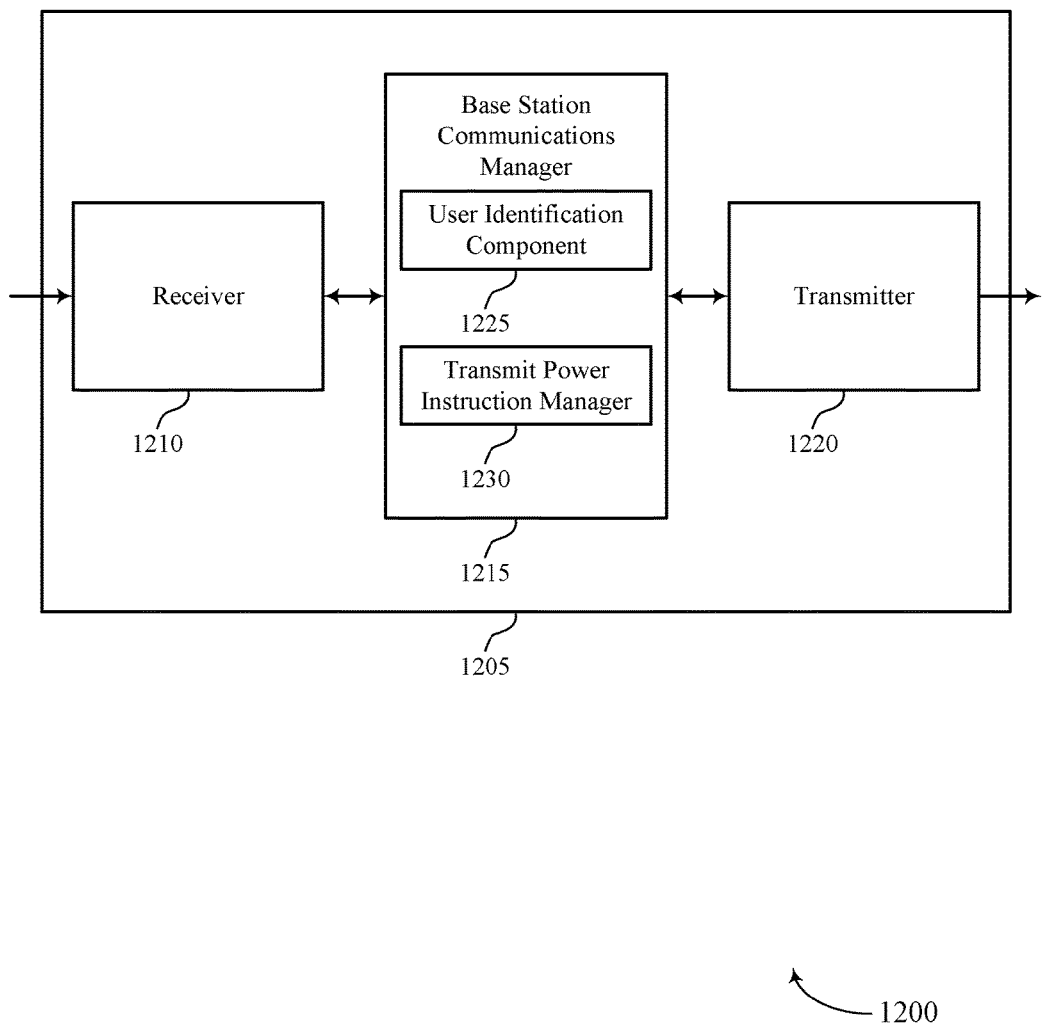

FIG. 12 shows a block diagram 1200 of a wireless device 1205 that supports uplink transmit power control during random access procedures in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink transmit power control during random access procedures, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include user identification component 1225 and transmit power instruction manager 1230.

User identification component 1225 may identify a UE 115, the UE 115 having a transmit beam and a receive beam. Transmit power instruction manager 1230 may transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof. In some cases, transmit power instruction manager 1230 may transmit the instruction based on an identified interference level. In some examples, transmit power instruction manager 1230 may transmit the instruction including the determined power offset. In some cases, transmitting the instruction includes transmitting the instruction in a MIB, RMSI, OSI, SIB, RRC signaling, a handover command, a MAC-CE, DCI, or a combination thereof. In some cases, the beam correspondence state indicates a correspondence between one or more uplink transmit beams of the UE 115, including the transmit beam, and one or more downlink receive beams of the UE 115, including the receive beam.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
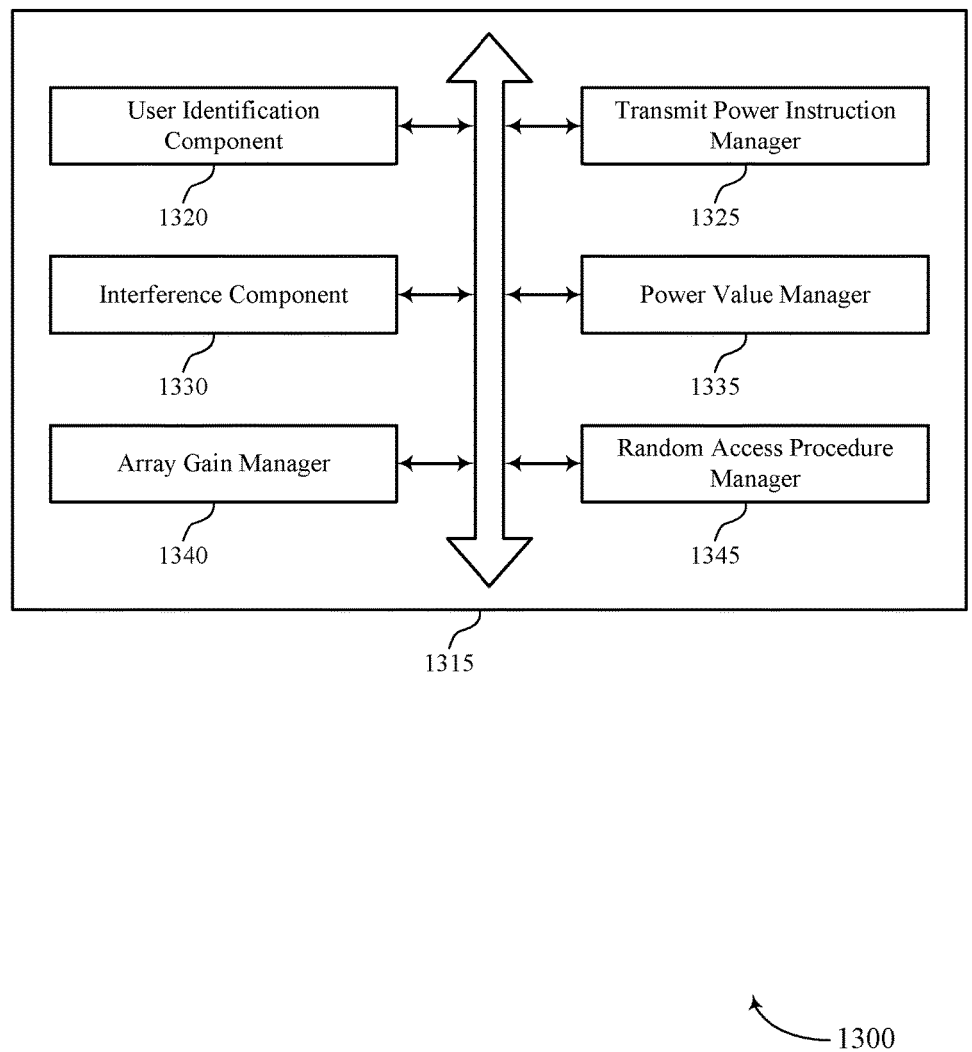

FIG. 13 shows a block diagram 1300 of a base station communications manager 1315 that supports uplink transmit power control during random access procedures in accordance with aspects of the present disclosure. The base station communications manager 1315 may be an example of aspects of a base station communications manager 1415 described with reference to FIGS. 11, 12, and 14. The base station communications manager 1315 may include user identification component 1320, transmit power instruction manager 1325, interference component 1330, power value manager 1335, beamforming gain manager 1340, and random access procedure manager 1345. Each of these modules may communicate, directly or indirectly, with one another (e.g., via one or more buses).

User identification component 1320 may identify a UE 115, the UE 115 having a transmit beam and a receive beam. Transmit power instruction manager 1325 may transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof. In some cases, transmit power instruction manager 1325 may transmit the instruction based on an identified interference level. In some examples, transmit power instruction manager 1325 may transmit the instruction including the determined power offset. In some cases, transmitting the instruction includes transmitting the instruction in a MIB, RMSI, OSI, SIB, RRC signaling, a handover command, a MAC-CE, DCI, or a combination thereof. In some cases, the beam correspondence state indicates a correspondence between one or more uplink transmit beams of the UE 115, including the transmit beam, and one or more downlink receive beams of the UE 115, including the receive beam.

Interference component 1330 may identify an estimated interference level, where the instruction is selected based on the estimated interference level. In some cases, interference component 1330 may identify an interference level associated with communications with the UE 115 and determine that the identified interference level does not satisfy a predetermined threshold. Additionally or alternatively, interference component 1330 may determine that the identified interference level satisfies a predetermined threshold.

Power value manager 1335 may transmit a power value regarding a beamforming gain to the UE 115. In some cases, power value manager 1335 may identify a power offset based on the determination, where the instruction includes an indication for the UE 115 to add the power offset when calculating the transmit power. Additionally or alternatively, power value manager 1335 may identify a power offset based on the determination, where the instruction includes an indication for the UE 115 to subtract the power offset when calculating the transmit power. Power value manager 1335 may determine a power offset associated with the receive beamforming gain and the transmit beamforming gain.

In some cases, the UE 115 applies a power offset value to the transmit power for the uplink random access transmission based on the beam correspondence state at the UE 115. In some cases, the power value denotes a power offset for the UE 115 to use to estimate a difference between the transmit beamforming gain and the receive beamforming gain, the UE 115 using the estimated difference to adjust the transmit power for the uplink random access transmission. In some examples, the UE 115 uses the transmitted power value as an estimate of the transmit beamforming gain, or the receive beamforming gain, or a combination thereof. In some cases, the determined power offset value indicates a difference between the receive beamforming gain and the transmit beamforming gain used by the UE 115 to adjust the transmit power.

Beamforming gain manager 1340 may transmit, to the UE 115, an indication of a fixed beamforming gain for the receive beam, or a fixed beamforming gain for the transmit beam, or a combination thereof. In some cases, the indication is transmitted in a MIB, RMSI, OSI, SIB, RRC signaling, a handover command, a MAC-CE, DCI, or a combination thereof. In some cases, the indication is transmitted with the instruction. Random access procedure manager 1345 may receive a random access message from the UE 115 on the transmit beam, where the random access message is transmitted by the UE 115 using an adjusted transmit power based on the transmitted instruction.

Figure 14:
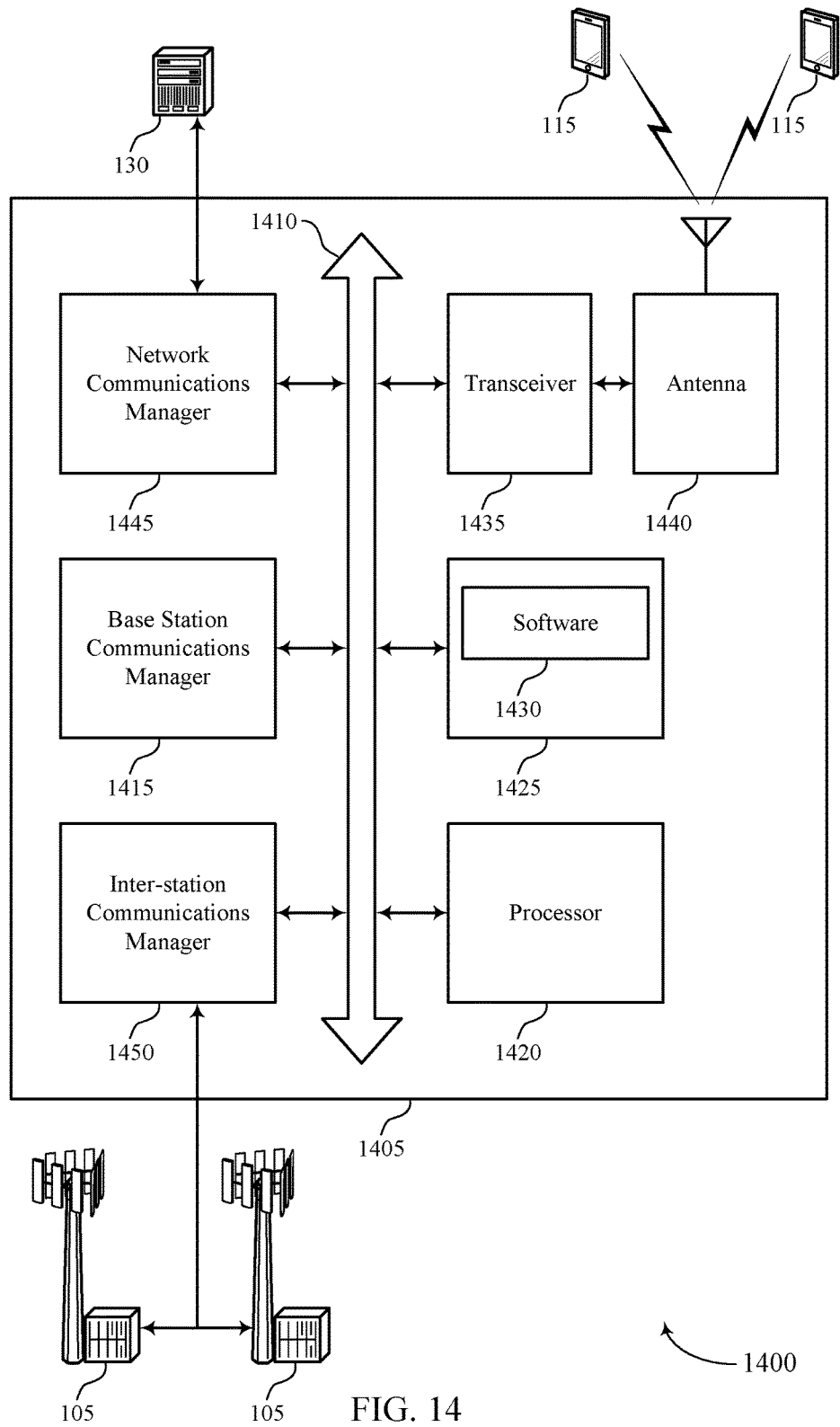
FIG. 14 illustrates a block diagram of a system including a base station that supports uplink transmit power control during random access procedures in accordance with aspects of the present disclosure.

FIG. 14 shows a diagram of a system 1400 including a device 1405 that supports uplink transmit power control during random access procedures in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting uplink transmit power control during random access procedures).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support uplink transmit power control during random access procedures. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
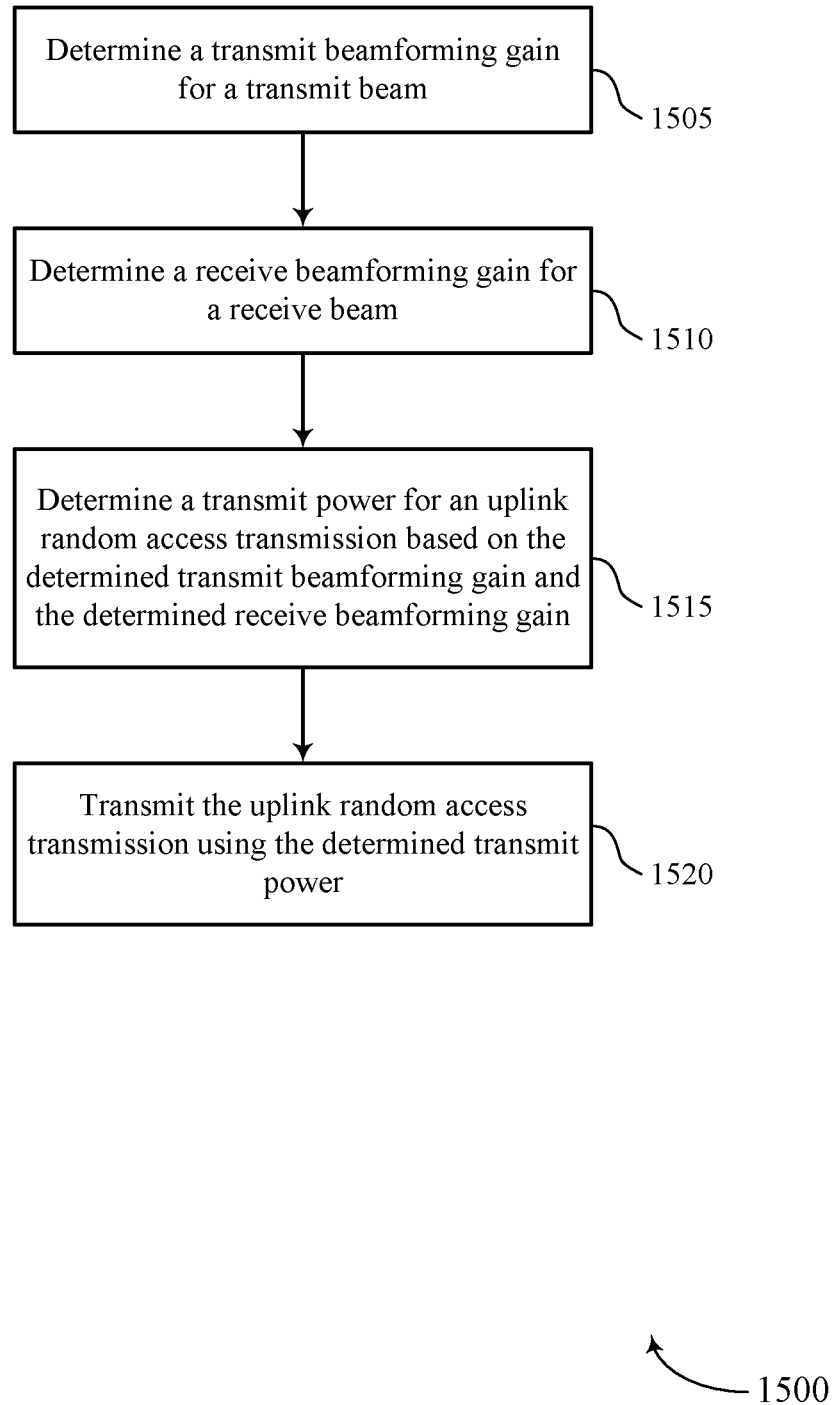
FIGS. 15 through 20 illustrate methods for uplink transmit power control during random access procedures in accordance with aspects of the present disclosure.

FIG. 15 shows a flowchart illustrating a method 1500 for uplink transmit power control during random access procedures in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may determine a transmit beamforming gain for a transmit beam of the UE 115. The operations of 1505 may be performed according to the methods described herein. In certain examples, aspects of the operations of 1505 may be performed by a beamforming gain component as described with reference to FIGS. 7 through 10.

At 1510 the UE 115 may determine a receive beamforming gain for a receive beam of the UE 115. The operations of 1510 may be performed according to the methods described herein. In certain examples, aspects of the operations of 1510 may be performed by a beamforming gain component as described with reference to FIGS. 7 through 10.

At 1515 the UE 115 may determine a transmit power for an uplink random access transmission based on the determined transmit beamforming gain and the determined receive beamforming gain. The operations of 1515 may be performed according to the methods described herein. In certain examples, aspects of the operations of 1515 may be performed by a transmit power manager as described with reference to FIGS. 7 through 10.

At 1520 the UE 115 may transmit the uplink random access transmission using the determined transmit power. The operations of 1520 may be performed according to the methods described herein. In certain examples, aspects of the operations of 1520 may be performed by a random access component as described with reference to FIGS. 7 through 10.

Figure 16:
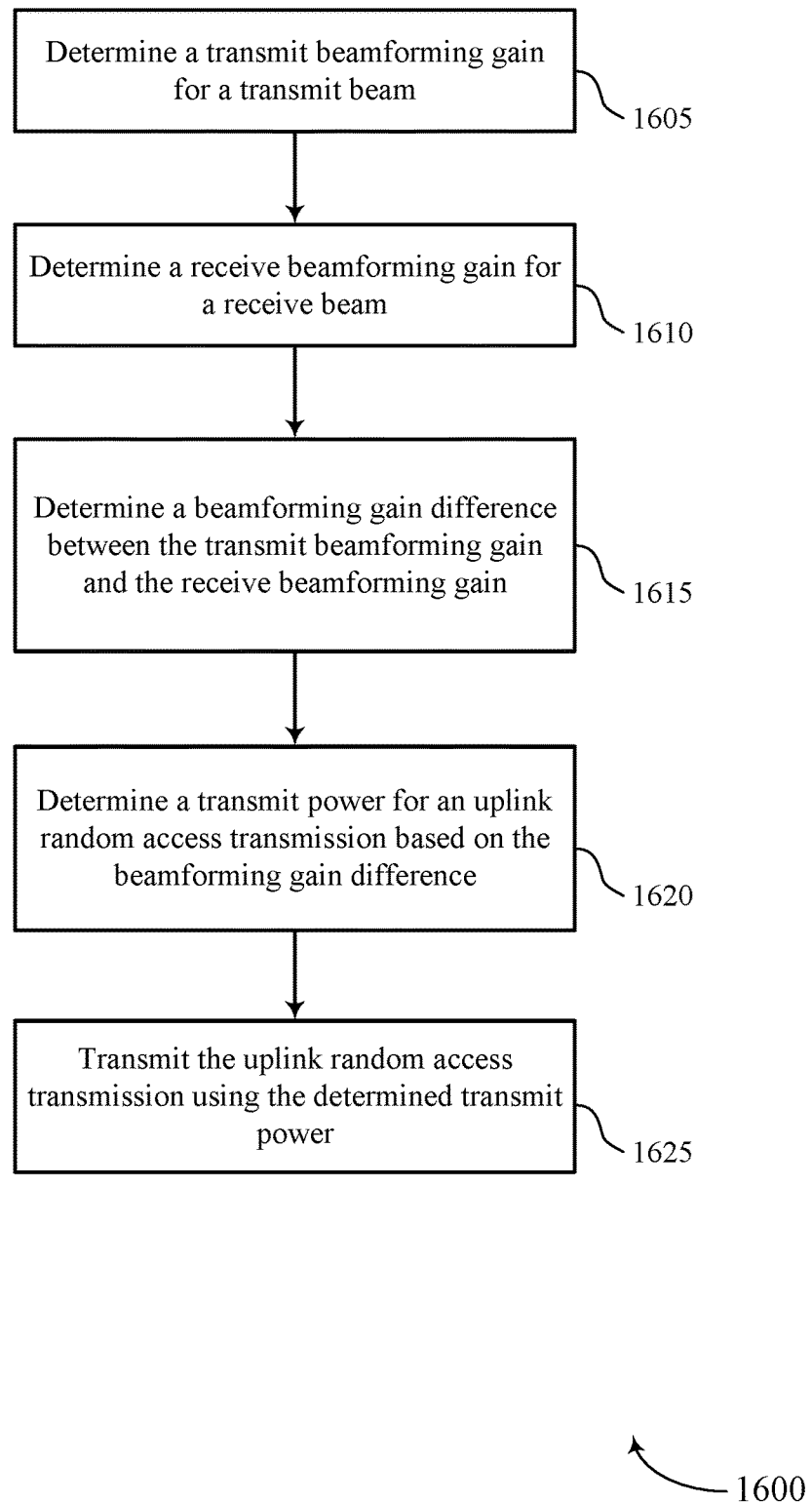

FIG. 16 shows a flowchart illustrating a method 1600 for uplink transmit power control during random access procedures in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may determine a transmit beamforming gain for a transmit beam of the UE 115. The operations of 1605 may be performed according to the methods described herein. In certain examples, aspects of the operations of 1605 may be performed by a beamforming gain component as described with reference to FIGS. 7 through 10.

At 1610 the UE 115 may determine a receive beamforming gain for a receive beam of the UE 115. The operations of 1610 may be performed according to the methods described herein. In certain examples, aspects of the operations of 1610 may be performed by a beamforming gain component as described with reference to FIGS. 7 through 10.

At 1615 the UE 115 may determine a beamforming gain difference between the transmit beamforming gain and the receive beamforming gain. The operations of 1615 may be performed according to the methods described herein. In certain examples, aspects of the operations of 1615 may be performed by a transmit power manager as described with reference to FIGS. 7 through 10.

At 1620 the UE 115 may determine a transmit power for an uplink random access transmission based on the determined beamforming gain difference. The operations of 1620 may be performed according to the methods described herein. In certain examples, aspects of the operations of 1620 may be performed by a transmit power manager as described with reference to FIGS. 7 through 10.

At 1625 the UE 115 may transmit the uplink random access transmission using the determined transmit power. The operations of 1625 may be performed according to the methods described herein. In certain examples, aspects of the operations of 1625 may be performed by a random access component as described with reference to FIGS. 7 through 10.

Figure 17:
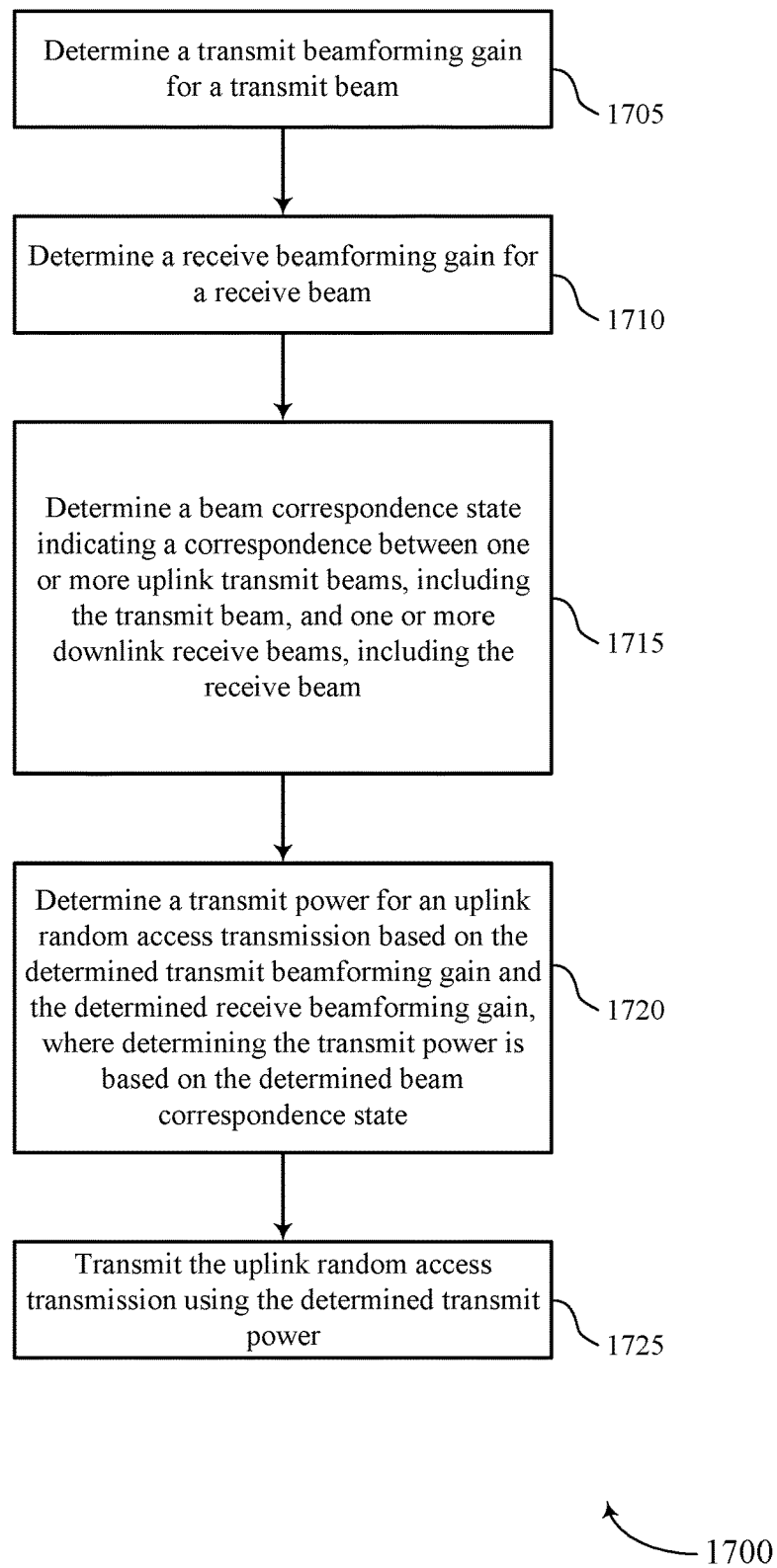

FIG. 17 shows a flowchart illustrating a method 1700 for uplink transmit power control during random access procedures in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may determine a transmit beamforming gain for a transmit beam of the UE 115. The operations of 1705 may be performed according to the methods described herein. In certain examples, aspects of the operations of 1705 may be performed by a beamforming gain component as described with reference to FIGS. 7 through 10.

At 1710 the UE 115 may determine a receive beamforming gain for a receive beam of the UE 115. The operations of 1710 may be performed according to the methods described herein. In certain examples, aspects of the operations of 1710 may be performed by a beamforming gain component as described with reference to FIGS. 7 through 10.

At 1715 the UE 115 may determine a beam correspondence state indicating a correspondence between one or more uplink transmit beams, including the transmit beam, and one or more downlink receive beams, including the receive beam. The operations of 1715 may be performed according to the methods described herein. In certain examples, aspects of the operations of 1715 may be performed by a beam correspondence manager as described with reference to FIGS. 7 through 10.

At 1720 the UE 115 may determine a transmit power for an uplink random access transmission based on the determined transmit beamforming gain and the determined receive beamforming gain, where determining the transmit power is based on the determined beam correspondence state. The operations of 1720 may be performed according to the methods described herein. In certain examples, aspects of the operations of 1720 may be performed by a transmit power manager as described with reference to FIGS. 7 through 10.

At 1725 the UE 115 may transmit the uplink random access transmission using the determined transmit power. The operations of 1725 may be performed according to the methods described herein. In certain examples, aspects of the operations of 1725 may be performed by a random access component as described with reference to FIGS. 7 through 10.

Figure 18:
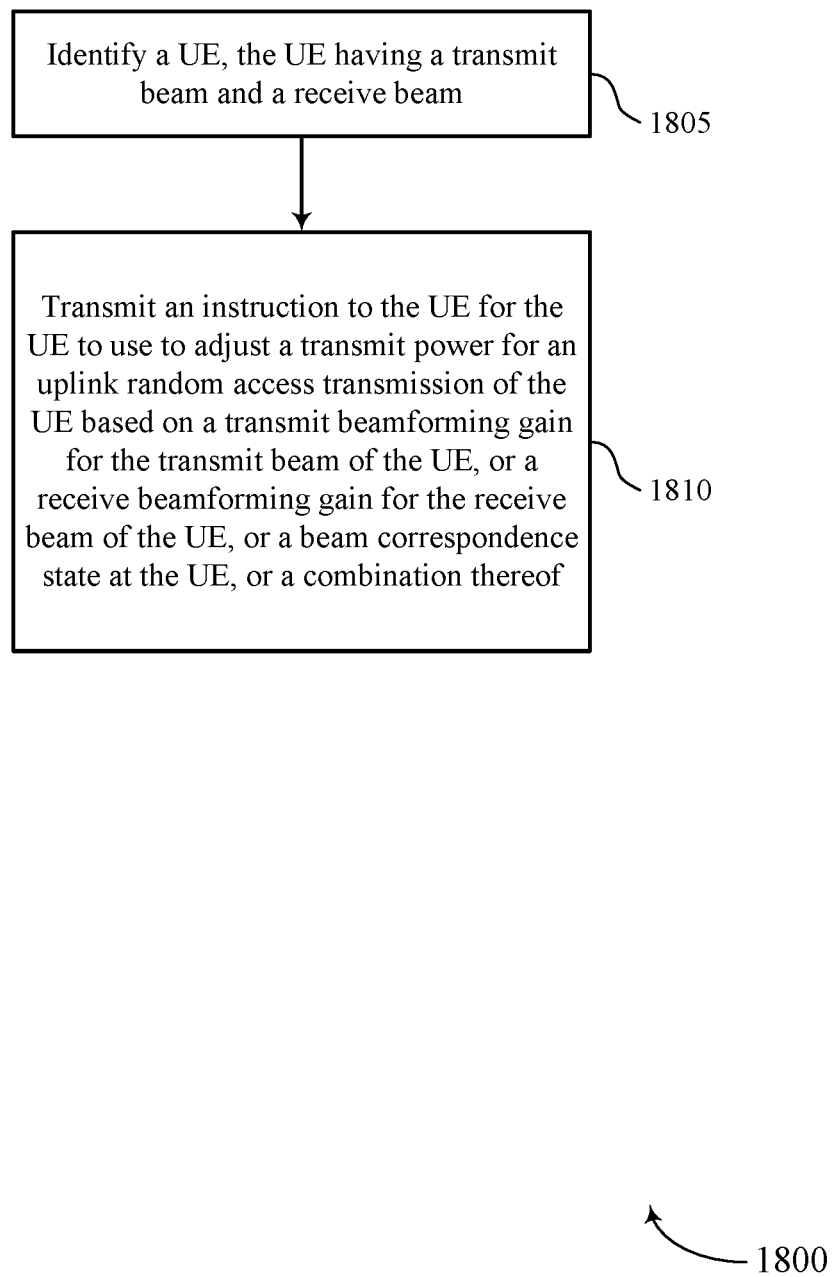

FIG. 18 shows a flowchart illustrating a method 1800 for uplink transmit power control during random access procedures in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify a UE 115, the UE 115 having a transmit beam and a receive beam. The operations of 1805 may be performed according to the methods described herein. In certain examples, aspects of the operations of 1805 may be performed by a user identification component as described with reference to FIGS. 11 through 14.

At 1810 the base station 105 may transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof. The operations of 1810 may be performed according to the methods described herein. In certain examples, aspects of the operations of 1810 may be performed by a transmit power instruction manager as described with reference to FIGS. 11 through 14.

Figure 19:
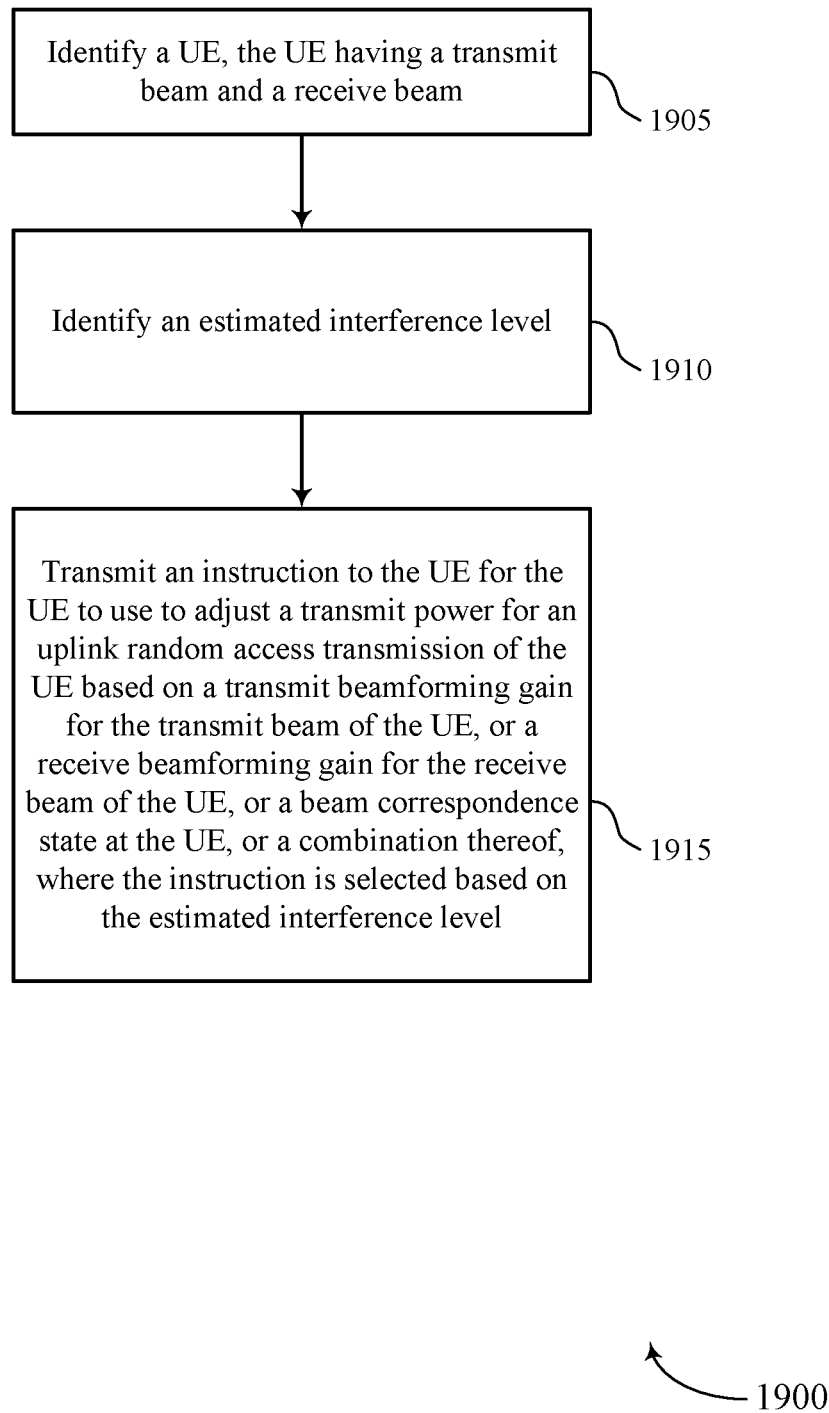

FIG. 19 shows a flowchart illustrating a method 1900 for uplink transmit power control during random access procedures in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify a UE 115, the UE 115 having a transmit beam and a receive beam. The operations of 1905 may be performed according to the methods described herein. In certain examples, aspects of the operations of 1905 may be performed by a user identification component as described with reference to FIGS. 11 through 14.

At 1910 the base station 105 may identify an estimated interference level. The operations of 1910 may be performed according to the methods described herein. In certain examples, aspects of the operations of 1910 may be performed by an interference component as described with reference to FIGS. 11 through 14.

At 1915 the base station 105 may transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof, where the instruction is selected based on the estimated interference level. The operations of 1915 may be performed according to the methods described herein. In certain examples, aspects of the operations of 1915 may be performed by a transmit power instruction manager as described with reference to FIGS. 11 through 14.

Figure 20:
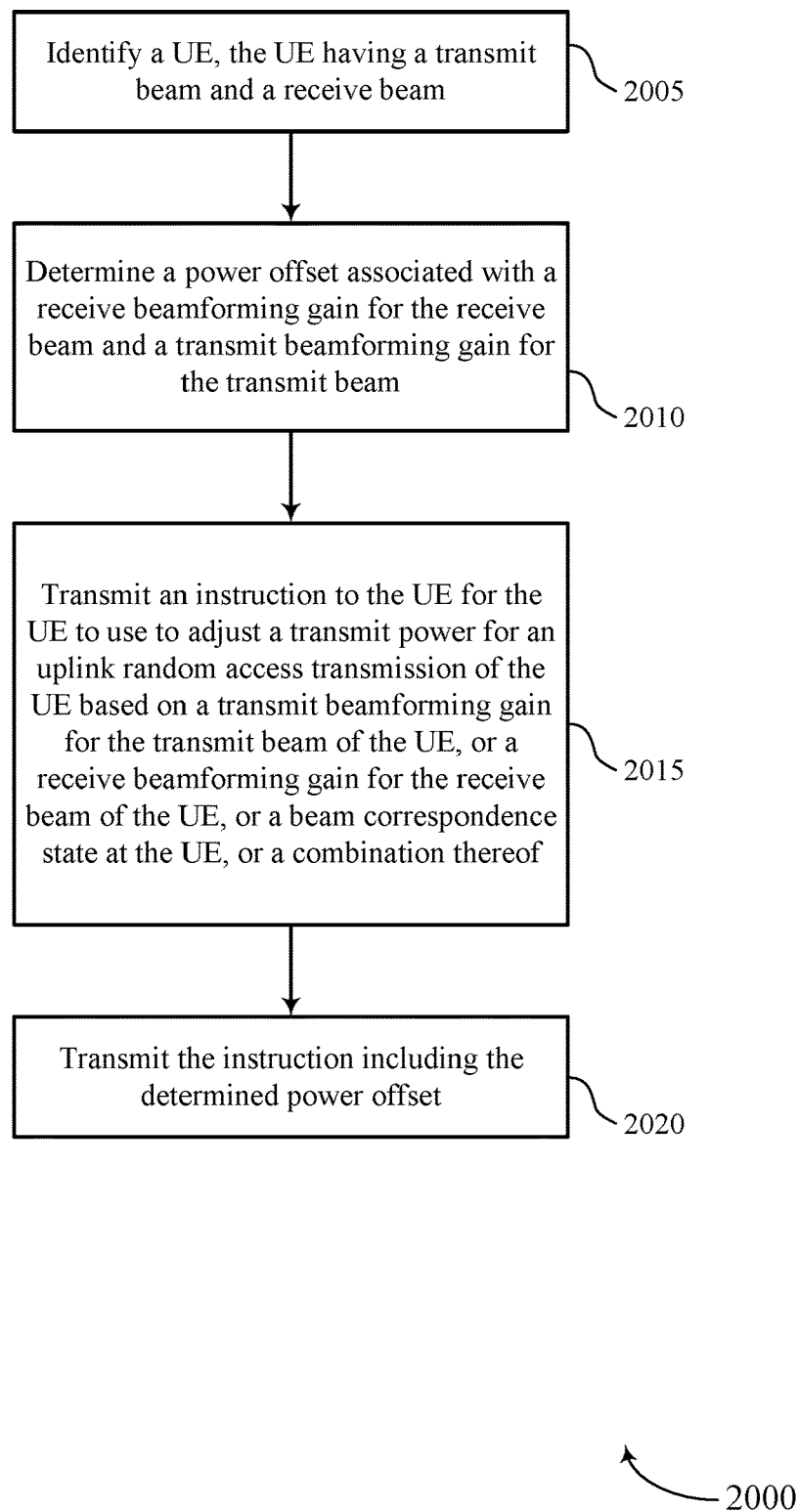

FIG. 20 shows a flowchart illustrating a method 2000 for uplink transmit power control during random access procedures in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may identify a UE 115, the UE 115 having a transmit beam and a receive beam. The operations of 2005 may be performed according to the methods described herein. In certain examples, aspects of the operations of 2005 may be performed by a user identification component as described with reference to FIGS. 11 through 14.

At 2010 the base station 105 may determine a power offset associated with a receive beamforming gain for the receive beam and a transmit beamforming gain for the transmit beam. The operations of 2010 may be performed according to the methods described herein. In certain examples, aspects of the operations of 2010 may be performed by a power value manager as described with reference to FIGS. 11 through 14.

At 2015 the base station 105 may transmit an instruction to the UE 115 for the UE 115 to use to adjust a transmit power for an uplink random access transmission of the UE 115 based on a transmit beamforming gain for the transmit beam of the UE 115, or a receive beamforming gain for the receive beam of the UE 115, or a beam correspondence state at the UE 115, or a combination thereof. The operations of 2015 may be performed according to the methods described herein. In certain examples, aspects of the operations of 2015 may be performed by a transmit power instruction manager as described with reference to FIGS. 11 through 14.

At 2020 the base station 105 may transmit the instruction including the determined power offset. The operations of 2020 may be performed according to the methods described herein. In certain examples, aspects of the operations of 2020 may be performed by a transmit power instruction manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining a transmit beamforming gain for a transmit beam of the UE;
   determining a receive beamforming gain for a receive beam of the UE;
   determining a transmit power for an uplink random access transmission based at least in part on adding or subtracting a power offset and an estimated path loss, wherein the power offset is proportional to a beamforming gain difference between the determined transmit beamforming gain and the determined receive beamforming gain; and
   transmitting the uplink random access transmission using the determined transmit power.

2. The method of claim 1, wherein determining the transmit power comprises:
   determining the beamforming gain difference between the transmit beamforming gain and the receive beamforming gain; and
   determining the transmit power based at least in part on the determined beamforming gain difference.

3. The method of claim 2, wherein the beamforming gain difference comprises a difference between a minimum beamforming gain for the transmit beam and a maximum beamforming gain for the receive beam.

4. The method of claim 2, wherein the beamforming gain difference comprises a difference between a minimum crossover point beamforming gain for a set of transmit beams, including the transmit beam, and a maximum beamforming gain for a set of receive beams, including the receive beam.

5. The method of claim 4, wherein the set of transmit beams comprise all transmit beams of the UE, and wherein the set of receive beams comprise all receive beams of the UE.

6. The method of claim 2, wherein the beamforming gain difference comprises a difference between a fixed beamforming gain for the transmit beam and a fixed beamforming gain for the receive beam.

7. The method of claim 6, further comprising:
   receiving, from a base station, an indication of the fixed beamforming gain for the transmit beam, or the fixed beamforming gain for the receive beam, or a combination thereof, wherein the indication is received in a master information block (MIB), or a remaining minimum system information (RMSI), or an other system information (OSI), or a system information block (SIB), or radio resource control (RRC) signaling, or a handover command, or a medium access control (MAC) control element (CE), or downlink control information (DCI), or a combination thereof.

8. The method of claim 2, wherein the beamforming gain difference comprises a difference between a maximum beamforming gain for the transmit beam and a fixed beamforming gain for the receive beam.

9. The method of claim 8, further comprising:
receiving, from a base station, an indication of the fixed beamforming gain for the receive beam, wherein the indication is received in a master information block (MIB), or a remaining minimum system information (RMSI), or an other system information (OSI), or a system information block (SIB), or radio resource control (RRC) signaling, or a handover command, or a medium access control (MAC) control element (CE), or downlink control information (DCI), or a combination thereof.

10. The method of claim 2, wherein the beamforming gain difference comprises a difference between a fixed beamforming gain for the transmit beam and a maximum beamforming gain for the receive beam.

11. The method of claim 10, further comprising:
receiving, from a base station, an indication of the fixed beamforming gain for the transmit beam, wherein the indication is received in a master information block (MIB), or a remaining minimum system information (RMSI), or an other system information (OSI), or a system information block (SIB), or radio resource control (RRC) signaling, or a handover command, or a medium access control (MAC) control element (CE), or downlink control information (DCI), or a combination thereof.

12. The method of claim 2, wherein determining the transmit power is further based at least in part on a target preamble received power and a maximum transmit power for the UE.

13. The method of claim 12, wherein determining the transmit power comprises:
adding the power offset to a sum of the target preamble received power and the estimated path loss.

14. The method of claim 12, wherein determining the transmit power comprises:
subtracting the power offset from a sum of the target preamble received power and the estimated path loss.

15. The method of claim 1, wherein the transmit beamforming gain comprises a transmit array gain, or a first antenna element gain, or a combination thereof, and wherein the receive beamforming gain comprises a receive array gain, or a second antenna element gain, or a combination thereof.

16. The method of claim 15, wherein the transmit beamforming gain comprises a summation of the transmit array gain and the first antenna element gain, and wherein the receive beamforming gain comprises a summation of the receive array gain and the second antenna element gain.

17. The method of claim 1, further comprising:
determining a beam correspondence state indicating a correspondence between one or more uplink transmit beams, including the transmit beam, and one or more downlink receive beams, including the receive beam, wherein the adjusting the transmit power is based on the determined beam correspondence state.

18. The method of claim 17, further comprising:
identifying one of a plurality of adjustment procedures to use to adjust the transmit power for the uplink random access transmission based at least in part on the determined transmit beamforming gain and the determined receive beamforming gain; and
adjusting the transmit power based on the identified adjustment procedure.

19. The method of claim 17, further comprising:
receiving, from a base station, an instruction to adjust the transmit power based at least in part on the determined beam correspondence state, wherein the instruction is received in a master information block (MIB), or a remaining minimum system information (RMSI), or an other system information (OSI), or a system information block (SIB), or radio resource control (RRC) signaling, or a handover command, or a medium access control (MAC) control element (CE), or downlink control information (DCI), or a combination thereof.

20. The method of claim 17, further comprising:
receiving an indication of the power offset from a base station, wherein determining the transmit power for the uplink random access transmission comprises:
applying the power offset based at least in part on the determined beam correspondence state.

21. The method of claim 1, wherein the uplink random access transmission comprises a message transmitted on a physical random access channel (PRACH) during a random access procedure.

22. A method for wireless communication at a base station, comprising:
identifying a user equipment (UE), the UE having a transmit beam and a receive beam; and
transmitting an instruction to the UE for the UE to use to adjust a transmit power for an uplink random access transmission of the UE based at least in part on a power offset that is proportional to a beamforming gain difference between a transmit beamforming gain for the transmit beam of the UE and a receive beamforming gain for the receive beam of the UE, wherein the instruction comprises an indication for the UE to add or subtract the power offset when calculating the transmit power.

23. The method of claim 22, further comprising:
identifying an estimated interference level, wherein the instruction is selected based at least in part on the estimated interference level.

24. The method of claim 22, further comprising:
transmitting a power value regarding a beamforming gain to the UE.

25. The method of claim 24, wherein the UE applies the power offset to the transmit power for the uplink random access transmission based at least in part on a beam correspondence state at the UE.

26. The method of claim 24, wherein the power value denotes the power offset for the UE to use to estimate a difference between the transmit beamforming gain and the receive beamforming gain, the UE using the estimated difference to adjust the transmit power for the uplink random access transmission.

27. The method of claim 22, further comprising:
identifying an interference level associated with communications with the UE;
determining that the identified interference level is above or below a predetermined threshold;
identifying the power offset based at least in part on the determination; and
transmitting the instruction based at least in part on the identified interference level.

28. The method of claim 22, wherein transmitting the instruction to the UE comprises:

transmitting the instruction in a master information block (MIB), or a remaining minimum system information (RMSI), or an other system information (OSI), or a system information block (SIB), or radio resource control (RRC) signaling, or a handover command, or a medium access control (MAC) control element (CE), or downlink control information (DCI), or a combination thereof.

29. An apparatus for wireless communication at a user equipment (UE), comprising:

a processor;

memory in electronic communication with the processor; and instructions stored in the memory and operable, when executed by the processor, to cause the apparatus to:

determine a receive beamforming gain for a receive beam of the UE;

determine a transmit power for an uplink random access transmission based at least in part on adding or subtracting a power offset and an estimated path loss, wherein the power offset is proportional to a beamforming gain difference between the determined transmit beamforming gain and the determined receive beamforming gain; and transmit the uplink random access transmission using the determined transmit power.

30. An apparatus for wireless communication at a base station, comprising:

a processor;

memory in electronic communication with the processor; and instructions stored in the memory and operable, when executed by the processor, to cause the apparatus to:

identify a user equipment (UE), the UE having a transmit beam and a receive beam; and transmit an instruction to the UE for the UE to use to adjust a transmit power for an uplink random access transmission of the UE based at least in part on a power offset that is proportional to a beamforming gain difference between a transmit beamforming gain for the transmit beam of the UE and a receive beamforming gain for the receive beam of the UE, wherein the instruction comprises an indication for the UE to add or subtract the power offset when calculating the transmit power.

* * * * *